US010981533B2

(12) United States Patent
Kobayashi et al.

(10) Patent No.: US 10,981,533 B2
(45) Date of Patent: Apr. 20, 2021

(54) SIDE AIRBAG DEVICE

(71) Applicant: Autoliv Development AB, Vårgårda (SE)

(72) Inventors: Yuto Kobayashi, Yokohama (JP); Makoto Fuma, Yokohama (JP); Hideho Fukuda, Yokohama (JP); Hiroyuki Taguchi, Yokohama (JP); Takanari Muroya, Yokohama (JP)

(73) Assignee: AUTOLIV DEVELOPMENT AB, Vargarda (SE)

( * ) Notice: Subject to any disclaimer, the term of this patent is extended or adjusted under 35 U.S.C. 154(b) by 249 days.

(21) Appl. No.: 16/094,008

(22) PCT Filed: May 11, 2017

(86) PCT No.: PCT/JP2017/017882
§ 371 (c)(1),
(2) Date: Oct. 16, 2018

(87) PCT Pub. No.: WO2017/199850
PCT Pub. Date: Nov. 23, 2017

(65) Prior Publication Data
US 2019/0111884 A1   Apr. 18, 2019

(30) Foreign Application Priority Data

May 20, 2016 (JP) .............................. JP2016-101613

(51) Int. Cl.
*B60R 21/2338* (2011.01)
*B60R 21/231* (2011.01)
(Continued)

(52) U.S. Cl.
CPC .... *B60R 21/2338* (2013.01); *B60R 21/23138* (2013.01); *B60R 21/237* (2013.01);
(Continued)

(58) Field of Classification Search
CPC .......... B60R 21/2338; B60R 21/23138; B60R 21/237; B60R 2021/23388;
(Continued)

(56) References Cited

U.S. PATENT DOCUMENTS 5,362,101 A * 11/1994 Sugiura ................. B60R 21/233
280/728.2
5,570,905 A * 11/1996 Dyer .................... B60R 21/2171
280/743.1
(Continued)

FOREIGN PATENT DOCUMENTS

JP    2000-142290 A    5/2000
JP    2004-189187 A    7/2004
(Continued)

OTHER PUBLICATIONS

International Search Report for PCT/JP2017/017882, ISA/JP, Tokyo, dated Jun. 13, 2017.

*Primary Examiner* — Paul N Dickson
*Assistant Examiner* — Timothy Wilhelm
(74) *Attorney, Agent, or Firm* — Stephen T. Olson; Harness, Dickey & Pierce, P.L.C.

(57) ABSTRACT

A side airbag device includes: an inflator; a cushion main body that is disposed at a side of a seat of a vehicle and that is expandable from the side toward a front of the vehicle by a gas; a cushion protrusion that is disposed at a vehicle front side with respect to the cushion main body and that is expandable to project further toward the front of the vehicle by receiving the gas from the cushion main body; a tether that is string-shaped, the tether bridging from the cushion protrusion over a predetermined position of the side of the seat, the tether maintaining the cushion protrusion in a state in which the cushion protrusion is folded back toward a rear of the vehicle; a sensor that receives information from the
(Continued)

vehicle; and a tether cutter that cuts the tether according to the information obtained by the sensor.

36 Claims, 25 Drawing Sheets

(51) Int. Cl.
  *B60R 21/237* (2006.01)
  *B60R 21/00* (2006.01)
  *B60R 21/16* (2006.01)
(52) U.S. Cl.
  CPC . *B60R 2021/0006* (2013.01); *B60R 2021/161* (2013.01); *B60R 2021/23146* (2013.01); *B60R 2021/23384* (2013.01); *B60R 2021/23388* (2013.01)
(58) Field of Classification Search
  CPC ...... B60R 2021/0006; B60R 2021/161; B60R 2021/23146; B60R 2021/23384
  See application file for complete search history.

(56) References Cited

U.S. PATENT DOCUMENTS

| | | | | |
|---|---|---|---|---|
| 5,584,508 | A * | 12/1996 | Maruyama | B60R 21/231 280/732 |
| 5,636,862 | A * | 6/1997 | Cheung | B60R 21/207 280/730.2 |
| 5,765,863 | A * | 6/1998 | Storey | B60R 21/207 280/729 |
| 5,806,881 | A * | 9/1998 | Richter | B60R 21/231 280/730.2 |
| 5,906,395 | A * | 5/1999 | Isaji | B60R 21/207 280/728.2 |
| 5,924,721 | A * | 7/1999 | Nakamura | B60R 21/23138 280/730.2 |
| 5,927,750 | A * | 7/1999 | Nakamura | B60R 21/23138 280/730.2 |
| 6,142,517 | A * | 11/2000 | Nakamura | B60R 21/23138 280/739 |
| 6,164,696 | A * | 12/2000 | Ellerbrok | B60R 21/2342 280/729 |
| 6,196,585 | B1 * | 3/2001 | Igawa | B60R 21/237 280/728.1 |
| 6,390,501 | B1 * | 5/2002 | Greib | B60R 21/233 280/739 |
| 6,457,741 | B2 * | 10/2002 | Seki | B60R 21/207 280/730.2 |
| 6,783,151 | B2 * | 8/2004 | Rasch | B60R 21/23138 280/729 |
| 7,059,634 | B2 * | 6/2006 | Bossecker | B60R 21/233 280/739 |
| 7,111,871 | B2 * | 9/2006 | Thomas | B60R 21/21 280/743.2 |
| 7,192,050 | B2 * | 3/2007 | Sato | B60R 21/23138 280/729 |
| 7,249,783 | B2 * | 7/2007 | Parkinson | B60R 21/217 280/736 |
| 7,328,915 | B2 * | 2/2008 | Smith | B60R 21/2338 280/739 |
| 7,347,450 | B2 * | 3/2008 | Williams | B60R 21/2338 280/739 |
| 7,350,811 | B2 * | 4/2008 | Sato | B60R 21/23138 280/730.1 |
| 7,353,669 | B2 * | 4/2008 | Ternon | D04B 21/14 280/728.1 |
| 7,419,184 | B2 * | 9/2008 | Green | B60R 21/231 280/736 |
| 7,434,832 | B2 * | 10/2008 | Umehara | B60R 21/207 280/730.2 |
| 7,475,904 | B2 * | 1/2009 | Hofmann | B60R 21/23138 280/730.2 |
| 7,481,456 | B2 * | 1/2009 | Nozaki | B60R 21/239 280/731 |
| 7,510,212 | B2 * | 3/2009 | Green | B60R 21/2338 280/738 |
| 7,594,678 | B2 * | 9/2009 | Schedler | B60R 21/23138 280/729 |
| 7,600,777 | B2 * | 10/2009 | Suzuki | B60R 21/231 280/730.2 |
| 7,712,766 | B2 * | 5/2010 | Gutmann | B60R 21/2338 280/728.2 |
| 7,766,385 | B2 * | 8/2010 | Fukawatase | B60R 21/2338 280/743.2 |
| 7,793,975 | B2 * | 9/2010 | Fukawatase | B60R 21/237 280/743.1 |
| 7,819,421 | B2 * | 10/2010 | Naito | B60R 21/233 280/730.2 |
| 7,819,423 | B2 * | 10/2010 | Loibl | B60R 21/233 280/730.2 |
| 7,845,676 | B2 * | 12/2010 | Ohhashi | D03D 1/0005 280/733 |
| 7,938,444 | B2 * | 5/2011 | Williams | B60R 21/2338 280/743.2 |
| 7,946,616 | B2 * | 5/2011 | Ochiai | B60R 21/23138 280/730.2 |
| 7,971,901 | B2 * | 7/2011 | Tomitaka | B60R 21/232 280/730.2 |
| 7,988,187 | B2 * | 8/2011 | Yamamura | B60R 21/232 280/730.2 |
| 8,047,564 | B2 * | 11/2011 | Kibat | B60R 21/2338 280/730.2 |
| 8,075,018 | B2 * | 12/2011 | Sugimoto | B60R 21/237 280/743.1 |
| 8,181,989 | B2 * | 5/2012 | Okuhara | B60R 21/235 280/730.2 |
| 8,215,668 | B2 * | 7/2012 | Oho | B60R 21/2171 280/736 |
| 8,353,528 | B2 * | 1/2013 | Mizuno | B60R 21/235 280/730.2 |
| 8,360,469 | B2 * | 1/2013 | Wiik | B60R 21/23138 280/743.2 |
| 8,382,151 | B2 * | 2/2013 | Kalandek | B60R 21/232 280/730.2 |
| 8,398,116 | B2 * | 3/2013 | Onda | B60R 21/23138 280/743.1 |
| 8,528,934 | B2 * | 9/2013 | Kobayshi | B60R 21/207 280/740 |
| 8,550,492 | B2 * | 10/2013 | Gwon | B60R 21/23138 280/729 |
| 8,651,515 | B2 * | 2/2014 | Baba | B60R 21/23138 280/730.2 |
| 8,684,401 | B2 * | 4/2014 | Shibayama | B60R 21/2334 280/730.2 |
| 8,727,375 | B2 * | 5/2014 | Suzuki | B60R 21/23138 280/730.2 |
| 8,777,257 | B2 * | 7/2014 | Fukawatase | B60R 21/2334 280/730.2 |
| 8,783,712 | B2 * | 7/2014 | Fukushima | B60R 21/233 280/730.2 |
| 9,004,531 | B1 * | 4/2015 | Quioc | B60R 21/2338 280/743.2 |
| 9,010,804 | B2 * | 4/2015 | Witt, Jr. | B60R 21/2171 280/743.2 |
| 9,033,362 | B2 * | 5/2015 | Fukawatase | B60R 21/239 280/728.2 |
| 9,039,037 | B2 * | 5/2015 | Fukushima | B60R 21/233 280/730.2 |
| 9,056,591 | B2 * | 6/2015 | Fujiwara | B60R 21/2346 |
| 9,067,558 | B2 * | 6/2015 | Akiyama | B60R 21/207 |
| 9,079,559 | B2 * | 7/2015 | Iwamoto | B60R 21/23138 |
| 9,085,280 | B2 * | 7/2015 | Katsumata | B60R 21/2342 |
| 9,108,587 | B2 * | 8/2015 | Rickenbach | B60R 21/233 |
| 9,120,457 | B2 * | 9/2015 | Kino | B60R 21/233 |
| 9,199,602 | B1 * | 12/2015 | Fischer | B60R 21/2338 |
| 9,211,824 | B2 * | 12/2015 | Arant | B60N 2/0244 |
| 9,216,712 | B1 * | 12/2015 | Kwon | B60R 21/239 |
| 9,227,591 | B2 * | 1/2016 | Sano | B60R 21/231 |

(56) References Cited

U.S. PATENT DOCUMENTS

| | | | |
|---|---|---|---|
| 9,238,446 B2* | 1/2016 | Azuma | B60R 21/237 |
| 9,254,811 B2* | 2/2016 | Hayashi | B60R 21/233 |
| 9,327,673 B2* | 5/2016 | Fukawatase | B60R 21/2338 |
| 9,409,542 B2* | 8/2016 | Fujiwara | D05B 13/00 |
| 9,452,728 B2* | 9/2016 | Zimmermann | B60R 21/23138 |
| 9,457,759 B2* | 10/2016 | Sugimoto | B60R 21/23138 |
| 9,505,374 B2* | 11/2016 | Matsuzaki | B60R 21/23138 |
| 9,533,648 B2* | 1/2017 | Fujiwara | B60R 21/207 |
| 9,573,551 B1* | 2/2017 | Wang | B60R 21/23138 |
| 9,598,042 B2* | 3/2017 | Schneider | B60R 21/231 |
| 9,616,841 B2* | 4/2017 | Futai | B60R 21/23138 |
| 9,663,061 B2* | 5/2017 | Mihm | B60R 21/23138 |
| 9,669,789 B2* | 6/2017 | Fujiwara | B60R 21/23138 |
| 9,682,681 B1* | 6/2017 | Patel | B60R 21/01512 |
| 9,694,723 B2* | 7/2017 | Shimizu | B60N 2/665 |
| 9,701,270 B2* | 7/2017 | Goto | B60R 21/23138 |
| 9,707,922 B2* | 7/2017 | Wiik | B60R 21/2346 |
| 9,796,351 B2* | 10/2017 | Fujiwara | B60R 21/207 |
| 9,849,857 B2* | 12/2017 | Fujiwara | B60R 21/23138 |
| 9,849,858 B2* | 12/2017 | Inazumi | B60R 21/2338 |
| 9,873,399 B2* | 1/2018 | Goto | B60R 21/231 |
| 9,932,011 B2* | 4/2018 | Hiraiwa | B60R 21/207 |
| 9,969,348 B2* | 5/2018 | Fujiwara | B60R 21/207 |
| 9,969,351 B2* | 5/2018 | Ohno | B60R 21/207 |
| 10,017,148 B2* | 7/2018 | Hayashi | B60R 21/237 |
| 10,023,147 B2* | 7/2018 | Kwon | B60R 21/216 |
| 10,029,645 B2* | 7/2018 | Aranzulla | B60R 21/276 |
| 10,035,485 B2* | 7/2018 | Fujiwara | B60R 21/2165 |
| 10,106,122 B2* | 10/2018 | Komatsu | B60R 21/237 |
| 10,131,310 B2* | 11/2018 | Futai | B60R 21/2346 |
| 10,131,312 B2* | 11/2018 | Wiik | B60R 21/23138 |
| 10,179,527 B2* | 1/2019 | Uno | B60N 2/90 |
| 10,207,668 B2* | 2/2019 | Goto | B60R 21/207 |
| 10,207,670 B2* | 2/2019 | Attenberger | B60R 21/23138 |
| 10,214,172 B2* | 2/2019 | Fujiwara | B60R 21/0136 |
| 10,246,041 B2* | 4/2019 | Kobayashi | B60R 21/207 |
| 10,286,870 B2* | 5/2019 | Yokoi | D06L 1/12 |
| 10,369,956 B2* | 8/2019 | Deng | B60R 21/2338 |
| 10,369,957 B2* | 8/2019 | Hatakeyama | B60R 21/23138 |
| 10,518,738 B2* | 12/2019 | Kobayashi | B60R 21/233 |
| 10,543,800 B2* | 1/2020 | Kwon | B60R 21/233 |
| 10,543,805 B2* | 1/2020 | Hiraiwa | B60R 21/2338 |
| 10,703,322 B2* | 7/2020 | Kitagawa | B60R 21/2338 |
| 10,787,145 B2* | 9/2020 | Berntsson | B60R 21/207 |
| 2002/0175511 A1* | 11/2002 | Dunkle | B60R 21/2338 |
| | | | 280/743.2 |
| 2004/0232682 A1* | 11/2004 | Keshavaraj | B60R 21/235 |
| | | | 280/743.1 |
| 2005/0184493 A1* | 8/2005 | Hofmann | B60R 21/239 |
| | | | 280/730.2 |
| 2006/0232054 A1* | 10/2006 | Schlosser | B60R 21/2338 |
| | | | 280/743.2 |
| 2007/0045997 A1* | 3/2007 | Abe | B60R 21/231 |
| | | | 280/729 |
| 2007/0057492 A1* | 3/2007 | Feller | B60R 21/239 |
| | | | 280/730.2 |
| 2007/0284859 A1* | 12/2007 | Kashiwagi | B60R 21/207 |
| | | | 280/730.2 |
| 2008/0174093 A1* | 7/2008 | Inoue | B60R 21/2338 |
| | | | 280/730.2 |
| 2008/0290637 A1* | 11/2008 | Mueller | B60R 21/207 |
| | | | 280/736 |
| 2009/0302588 A1* | 12/2009 | Schramm | B60R 21/233 |
| | | | 280/743.2 |
| 2010/0140910 A1* | 6/2010 | Fischer | B60R 21/235 |
| | | | 280/743.2 |
| 2012/0038135 A1* | 2/2012 | Oomori | B60R 21/23138 |
| | | | 280/730.2 |
| 2013/0038046 A1* | 2/2013 | Inuzuka | B60R 21/239 |
| | | | 280/743.2 |
| 2013/0079208 A1* | 3/2013 | Wiik | B60R 21/237 |
| | | | 493/405 |
| 2014/0103625 A1* | 4/2014 | Thomas | B60R 21/2346 |
| | | | 280/730.2 |
| 2014/0151985 A1 | 6/2014 | Hotta et al. | |
| 2014/0210192 A1* | 7/2014 | Hotta | B60R 21/23138 |
| | | | 280/730.2 |
| 2015/0097359 A1* | 4/2015 | Rickenbach | B60R 21/23138 |
| | | | 280/729 |
| 2015/0115583 A1* | 4/2015 | Azuma | B60R 21/233 |
| | | | 280/740 |
| 2015/0183393 A1* | 7/2015 | Kino | B60R 21/233 |
| | | | 280/729 |
| 2015/0217714 A1* | 8/2015 | Fujiwara | B60R 21/235 |
| | | | 280/729 |
| 2015/0321638 A1 | 11/2015 | Sugimoto et al. | |
| 2015/0367804 A1* | 12/2015 | Fujiwara | B60R 21/23138 |
| | | | 280/730.2 |
| 2015/0367806 A1* | 12/2015 | Fujiwara | B60R 21/239 |
| | | | 280/729 |
| 2016/0107604 A1* | 4/2016 | Fujiwara | B60R 21/23138 |
| | | | 280/729 |
| 2016/0114755 A1* | 4/2016 | Matsuzaki | B60R 21/207 |
| | | | 280/730.2 |
| 2016/0159306 A1* | 6/2016 | Fujiwara | B60R 21/23138 |
| | | | 280/728.2 |
| 2016/0347222 A1* | 12/2016 | Uno | B60N 2/665 |
| 2017/0113645 A1* | 4/2017 | Hayashi | B60R 21/237 |
| 2018/0290619 A1* | 10/2018 | Kitagawa | B60R 21/207 |
| 2019/0001916 A1* | 1/2019 | Jo | B60R 21/23138 |
| 2019/0092271 A1* | 3/2019 | Park | B60R 21/23138 |
| 2019/0118759 A1* | 4/2019 | Kobayashi | B60R 21/23138 |
| 2019/0283700 A1* | 9/2019 | Kwon | B60R 21/23138 |
| 2019/0359165 A1* | 11/2019 | Kobayashi | B60R 21/233 |
| 2019/0375365 A1* | 12/2019 | Kobayashi | B60N 2/427 |

FOREIGN PATENT DOCUMENTS

| | | |
|---|---|---|
| JP | 2007-216943 A | 8/2007 |
| JP | 2013-35473 A | 2/2013 |
| JP | 2014-104965 A | 6/2014 |
| JP | 2015-30298 A | 2/2015 |
| JP | 2015-93657 A | 5/2015 |
| JP | 2015-214252 A | 12/2015 |
| WO | WO-2015/093421 A1 | 6/2015 |

* cited by examiner

A-A Cross Section

B-B Cross Section

C-C Cross Section

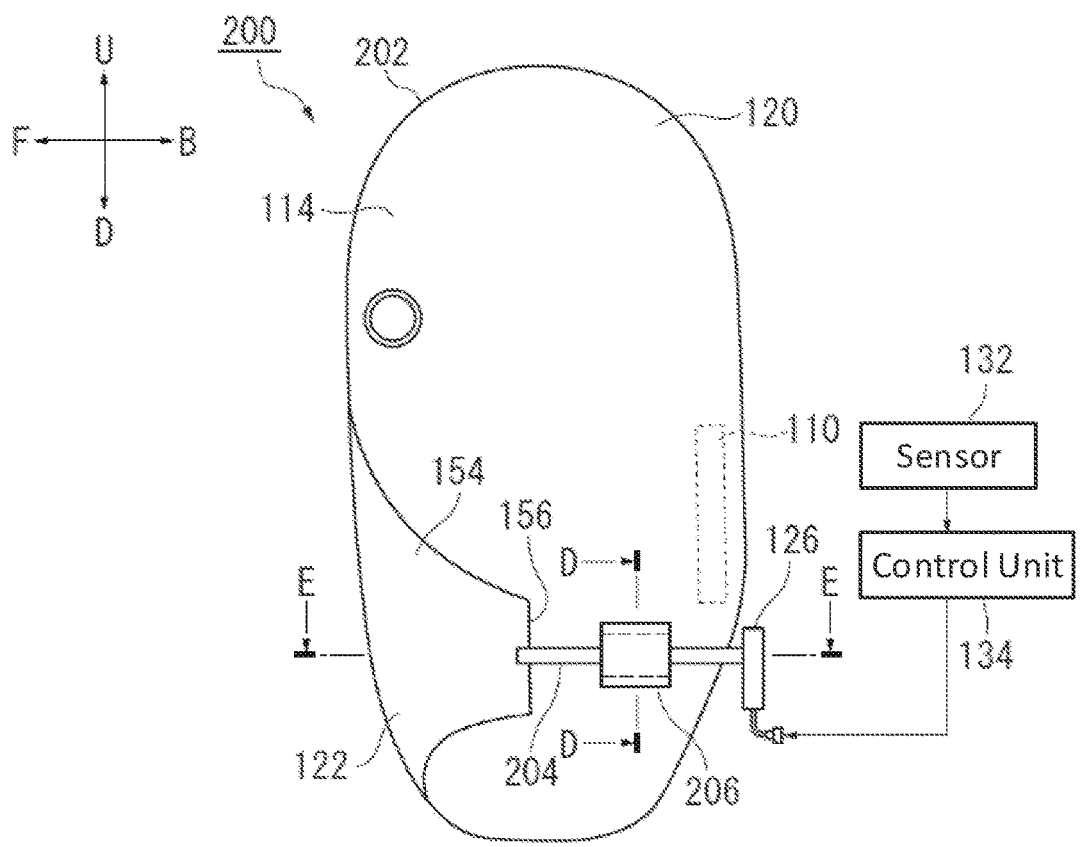
Fig. 8A
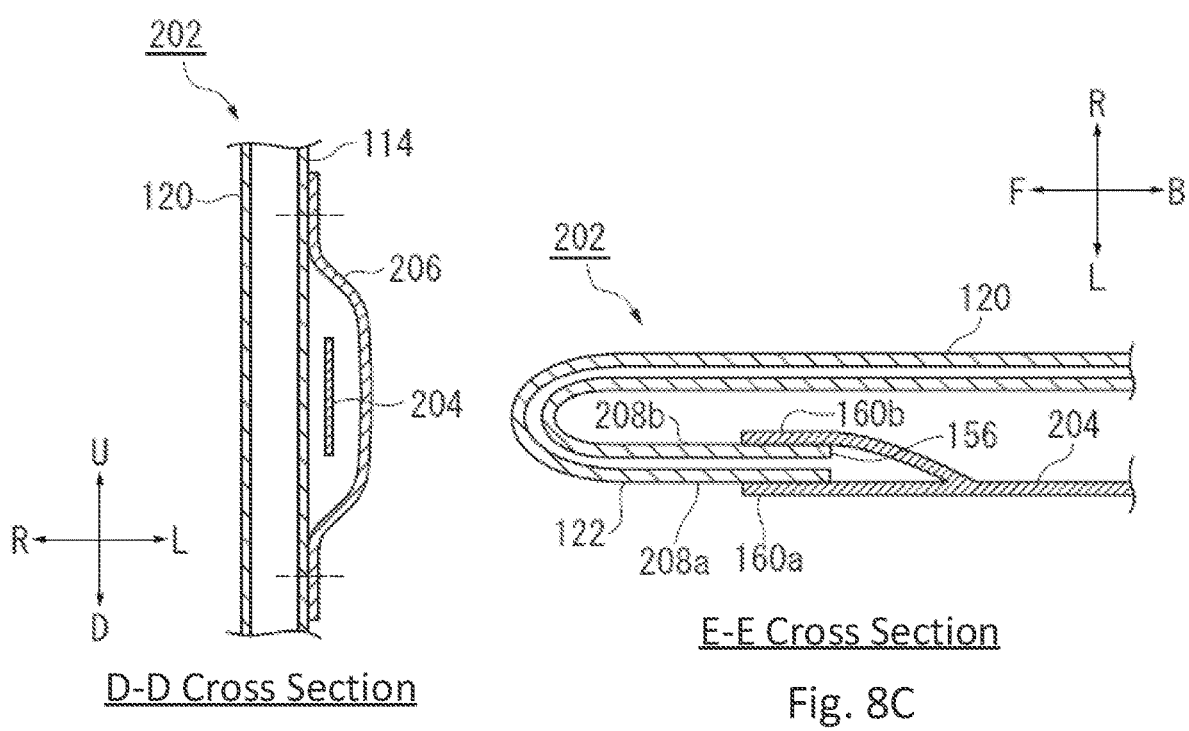
D-D Cross Section
Fig. 8B
E-E Cross Section
Fig. 8C G-G Cross Section H-H Cross Section I-I Cross Section K-K Cross Section

SIDE AIRBAG DEVICE

CROSS-REFERENCE TO RELATED APPLICATIONS

This application is a 371 U.S. National Stage of International Application No. PCT/JP2017/017882, filed May 11, 2017, which claims priority to Japanese Patent Application No. 2016-101613, filed May 20, 2016. The disclosures of the above applications are incorporated herein by reference.

TECHNICAL FIELD

The present invention relates to a side airbag device that has a cushion main body that is disposed at a side part of a seat of a vehicle and is expandable from the side part toward a front side of the vehicle by a gas.

BACKGROUND ART

In the recent years, an airbag device is mostly equipped as the standard equipment on a vehicle. The airbag device is a safety device being operated in an emergency such as a vehicle collision and protects an occupant by receiving the occupant by expanding and deploying an airbag cushion with a gas pressure. There are various kinds of airbag devices according to the installation positions or the use. For instance, a front airbag device is provided at a center of a steering wheel so that a driver can be protected from a collision in front and rear directions. In addition, in order to protect occupants from an impact in a vehicle width direction by such as a side collision, a curtain airbag device is provided near a ceiling above a side window and a side airbag device is provided at a side part of a seat.

A shape of an airbag cushion is set in consideration of such as a positional relationship with an occupant and a surrounding structure. For instance, a vehicle airbag of Patent Document 1 has an airbag body for a passenger seat in which a capacity is relatively large. In Patent Document 1, in consideration of the positional relationship with a head of the occupant, an expansion control tether is provided inside of the airbag body. By pulling a base cloth of the airbag body from the inside, the expansion control tether suppresses the expansion and the load to the occupant.

PRIOR ART DOCUMENT

Patent Document

Patent Document 1: Japanese Patent Publication Number 2000-142290.

SUMMARY OF THE INVENTION

Problems to be Solved by the Invention

With respect to an airbag cushion of a side airbag device, a measure for suppressing the load that can be given to an occupant during the restraint is requested as well. For instance, the load that can be given to the occupant by the airbag cushion increases in proportion to such as a collision speed at a vehicle collision. An internal pressure of the airbag cushion corresponds to an output of an inflator that is an origin of a supply of the gas, however, it is not realistic to modify the output itself of the inflator according to the collision speed from the point of the complication of the structure and the cost.

The present invention attempts to solve these problems. An object of the present invention is to provide a side airbag device that can adjust an internal pressure of an airbag cushion according to various conditions such as a collision speed, a collision angle, a physique of an occupant, and collision energy at a vehicle collision.

Means for Solving the Problems

In order to solve the above problems, a side airbag device according to the present invention includes the following most essential features: an inflator that supplies a gas; a cushion main body that is disposed at a side of a seat of a vehicle and that is expandable from the side toward a front of the vehicle by the gas; a cushion protruding part that is disposed at a vehicle front side with respect to the cushion main body and that is expandable to project further toward the front of the vehicle by receiving the gas from the cushion main body; a tether that is string-shaped, the tether bridging from the cushion protruding part over a predetermined position of the side of the seat, the tether maintaining the cushion protruding part in a state in which the cushion protruding part is folded back toward a rear of the vehicle; a sensor that receives predetermined information from the vehicle; and a tether cutter that cuts the tether according to the information obtained by the sensor.

According to the configuration explained above, it becomes possible to adjust the rigidity of the cushion main body according to the information such as a state of a vehicle and a physique of an occupant that are obtained by a sensor. For instance, when a sensor for a side collision and a weight detection sensor of the occupant that is formed in the seat are utilized as the sensor explained above, the information regarding the collision speed in a horizontal (sidewise) direction and the physique of the occupant can be obtained, and a tether can be cut when a predetermined condition is met. For instance, when the collision speed in the horizontal direction is higher than a predetermined value, because a moving speed in the horizontal direction of the occupant becomes high, an injury value of the cushion main body for the occupant tends to be high. Further, when the physique of the occupant is less than a predetermined value (for instance, is less than a pertinent value for an adult male), a tolerance for the collision energy is expected to be low. Accordingly, in the configuration explained above, when the collision speed in the horizontal direction is higher than the predetermined value and the physique of the occupant is less than the predetermined value, the tether is separated by the movement of a tether cutter and a cushion protruding part is expanded and deployed. As a result, because an entire capacity of the airbag cushion increases, the internal pressure of the cushion main body can be suppressed as compared with the case in which the cushion protruding part was not expanded and deployed. Therefore, when the occupant who has the higher moving speed or who is a petite occupant is restrained, the injury value for the occupant can be suppressed.

On the other hand, when the collision speed in the horizontal direction is low, the moving speed of the occupant in the horizontal direction also becomes low, therefore, the injury value for the occupant does not tend to be high so much even by the cushion main body that is expanded with the high internal pressure. Further, when the physique of the occupant is more than the predetermined value (for instance, is more than the pertinent value for the adult male), the tolerance for collision energy is also expected to be high. Accordingly, when the collision speed is less than the predetermined value and when the physique of the occupant is more than the predetermined value, the tether cutter does not move and the expansion and the deployment of the cushion protruding part is prevented by pulling the cushion protruding part by the tether. In this case, the entire capacity of the airbag cushion is suppressed without the expansion and the deployment of a cushion collision part and the cushion main body is thickly expanded in a vehicle width direction at a high internal pressure. Therefore, the occupant who has the lower moving speed or who is a large occupant can be sufficiently restrained.

The cushion protruding part may have a protruding vent at a leading end of the cushion protruding part at the vehicle front side. When the cushion is expended and deployed, the protruding vent opens toward the front of the vehicle. By providing the protruding vent, the discharge of the gas from the airbag cushion increases such as when the collision speed is higher than the predetermined value, and as a result, the internal pressure of the entire airbag cushion can be further suppressed. Therefore, the load that can be given to the occupant who has, such as, the higher moving speed can also be further suppressed.

The cushion protruding part may have a side vent in an overlap area between the cushion main body and the folded-back cushion protruding part, and the side vent has an opening. By providing the side vent, the gas is discharged from the airbag cushion such as when the collision speed is higher than the predetermined value, and as a result, the internal pressure of the entire airbag cushion can also be further suppressed. Therefore, the load that can be given to the occupant who has, such as, the higher moving speed can also be further suppressed.

The cushion main body has a vent hole in an overlap area between the cushion main body and the folded-back cushion protruding part, and the vent hole has an opening. By providing the vent hole having the configuration explained above, the gas is discharged from the airbag cushion such as when the collision speed is higher than the predetermined value, and as a result, the internal pressure of the entire airbag cushion can also be further suppressed. Therefore, the load that can be given to the occupant who has, such as, the higher moving speed can also be further suppressed.

When the cushion protruding part is expanded by receiving the gas, a width of the cushion protruding part in a vehicle vertical direction is tapered off toward the vehicle front side. As long as the cushion protruding part having the shape explained above, the gas can be smoothly flown to the tip (leading end) thereof.

The tether bridges over a leading end of the cushion protruding part. The cushion protruding part can be efficiently pulled and can be folded back with the tether having the configuration explained above.

The side airbag device may further include at least one reinforcement that is attached to the cushion protruding part to improve rigidity of the cushion protruding part. A durability against the gas of the cushion protruding part can be enhanced by the reinforcement.

The reinforcement is provided as a ductile fabric material that contains a plurality of different polymeric fibers. Further, a shape of the reinforcement is maintained by fusing at least part of the polymeric fibers. Further, a state in which at least a part of the reinforcement explained above is compressed can also be adopted. For instance, a heating and pressuring processing to the reinforcement is performed in a state in which the cushion protruding part is folded back, and as a result, it becomes possible that the shape of the reinforcement is maintained and the foldback of the cushion protruding part can be held.

The reinforcement may have a state of a nonwoven fabric in which the polymeric fibers are intertwined without being weaved. According to this configuration, the reinforcement explained above can be suitably realized.

The plurality of different polymeric fibers have a two-component conjugate fiber in a sheath-core structure. Further, a core of the two-component conjugate fiber is configured by a first polymeric material, and a sheath of the two-component conjugate fiber is configured by a second polymeric material that has a lower melting point than the first polymeric material. For instance, the first polymeric material may be a polyethylene terephthalate homopolymer, and the second polymeric material may be a polyethylene terephthalate copolymer. According to these configurations, the reinforcement explained above can be suitably realized.

The plurality of different polymeric fibers may have a single component fiber configured by a single component. Further, it is preferred that the single component fiber has a higher melting point than a surface of another polymeric fiber contained in the reinforcement. For instance, the single component fiber may be configured by polyethylene terephthalate. According to these configurations, the reinforcement explained above can be suitably realized.

The reinforcement is thicker than a base cloth of the cushion main body. According to this reinforcement, the rigidity of the cushion protruding part can be suitably improved.

The reinforcement may be divided into a plurality of pieces that are disposed in a direction from the cushion main body toward a leading end of the cushion protruding part. According to this configuration, the cushion protruding part can be suitably folded back even after installing the reinforcement.

The cushion protruding part may be in a state in which the cushion protruding part is folded back on a side surface of the cushion main body at either an interior side or an exterior side in a vehicle width direction. Further, the reinforcement may be disposed at an outside of the folded-back cushion protruding part. According to the reinforcement having the configuration explained above, the cushion protruding part can be suitably reinforced.

The cushion protruding part may be in a state in which the cushion protruding part is folded back on a side surface of the cushion main body at either an interior side or an exterior side in a vehicle width direction. Further, the reinforcement may be disposed at an inside of the folded-back cushion protruding part. According to the reinforcement having the configuration explained above, the cushion protruding part can be suitably reinforced.

The reinforcement may be in a state in which the reinforcement holds parts of the cushion protruding part and the cushion main body from both sides in a vehicle width direction. According to this configuration, the cushion protruding part can be further suitably reinforced.

In the side airbag device, the cushion protruding part may have an outer peripheral sewing part in which a base cloth of the cushion protruding part is sewed along an outer peripheral of the cushion protruding part in view of a vehicle width direction. Further, the reinforcement may be sewed together with the outer peripheral sewing part. According to this configuration, the reinforcement can be installed on the cushion protruding part in a concise manner.

The tether may maintain the cushion protruding part in a state in which the cushion protruding part is folded back so as to be embedded into an inside of the cushion main body. Further, the tether may bridge over the predetermined position of the side of the seat by passing through the inside of the cushion main body. According to this configuration, the cushion protruding part that is expanded and deployed only when such as the collision speed and the physique of the occupant are higher than the predetermined value can also be realized.

A leading end that is folded back of the cushion protruding part is folded back again toward the front of the vehicle. According to this configuration, the cushion protruding part can be suitably folded.

The tether may maintain the cushion protruding part in a state in which the cushion protruding part is folded back on a side surface of the cushion main body at either an interior side or an exterior side in a vehicle width direction. According to this configuration, the cushion protruding part can also be suitably folded.

A predetermined side surface hole may be provided in the side surface of the cushion main body on which the cushion protruding part is folded back. Further, the tether may bridge over the predetermined position of the side of the seat by passing through an inside of the cushion main body from the side surface hole. According to this configuration, the tether can bridge over without being bent.

The side airbag device may also include an interference member that is disposed on the tether located in the inside of the cushion main body. Further, the interference member prevents the tether from being pulled out from the side surface hole. Because the interference member is provided, it is prevented that the cut tether is popped out from the cushion main body.

The side airbag device may also include an inner bag that is disposed in the inside of the cushion main body, and a base cloth of the inner bag surrounds the inflator. Further, the tether passes through an inside of the inner bag, and the interference member is disposed in the inside of the inner bag and interferes with the inner bag. According to this configuration, it is also prevented that the cut tether is popped out from the cushion main body.

The interference member may be a knot provided at the tether. Further, the interference member may be part of the tether that is in a state in which the tether is folded back and is sewed. Further, the interference member may be a patch that is attached to the tether and that projects in a direction crossing the tether. According to these configurations, the interference member can be suitably realized.

The side airbag device may also include a branching tether that bridges over between the cushion main body and the tether in an inside of the cushion main body so as to prevent the tether from pulling out from the side surface hole. By having the branching tether, it is also prevented that the cut tether is popped out from the cushion main body.

The side surface hole may be provided on a linear line connecting between a connection of the tether on the cushion protruding part and the predetermined position of the side of the seat. According to this configuration, the tether can bridge over at the shortest distance.

In the side airbag device, a leading end of the cushion protruding part is folded back again toward the front of the vehicle. According to this configuration, the cushion protruding part can be suitably folded.

A first retaining member may be disposed on a side surface of the cushion main body on which the cushion protruding part is folded back. Further, the tether passes through the first retaining member. According to this configuration, the tether can bridge over without being bent.

A second retaining member may be disposed on a side surface of the cushion main body on which the cushion protruding part is folded back. Further, a leading end of the cushion protruding part is inserted in the second retaining member. According to this configuration, such as the fluttering of the cushion protruding part can be suppressed.

In the side airbag device, the cushion protruding part may have an outer peripheral sewing part in which a base cloth of the cushion protruding part is sewed along an outer peripheral of the cushion protruding part in view of a vehicle width direction. Further, the tether may be sewed together with the outer peripheral sewing part. According to this configuration, the tether can be connected in a concise manner.

Part of the tether located at the cushion protruding part is branched into two parts that are sewed together with the outer peripheral sewing part. Further, it is preferred that ends of the two parts that are branched from the tether are not overlapped each other. According to this configuration, the tether can also be connected in a concise manner.

In the side airbag device, the cushion protruding part may have an outer peripheral sewing part in which a base cloth of the cushion protruding part is sewed along an outer peripheral of the cushion protruding part in view of a vehicle width direction. Further, the tether is connected to an area of the cushion protruding part other than the outer peripheral sewing part. Further, part of the tether located at the cushion protruding part is branched into two parts, an end of one of the two parts is connected to a left side of the cushion protruding part in the vehicle width direction, and an end of the other of the two parts is connected to a right side of the cushion protruding part in the vehicle width direction. According to these configurations, the tether can also be connected in a concise manner.

Effects of the Invention

According to the present invention, it becomes possible to provide a side airbag device that can adjust an internal pressure of an airbag cushion according to the various conditions such as a collision speed, a collision angle, a physique of an occupant, and collision energy at a vehicle collision.

BRIEF DESCRIPTION OF THE DRAWINGS

FIG. 8 is a diagram that exemplarily shows an airbag device according to a third embodiment of the present invention.

EXPLANATION OF REFERENCE SIGNS

Figure 1A:
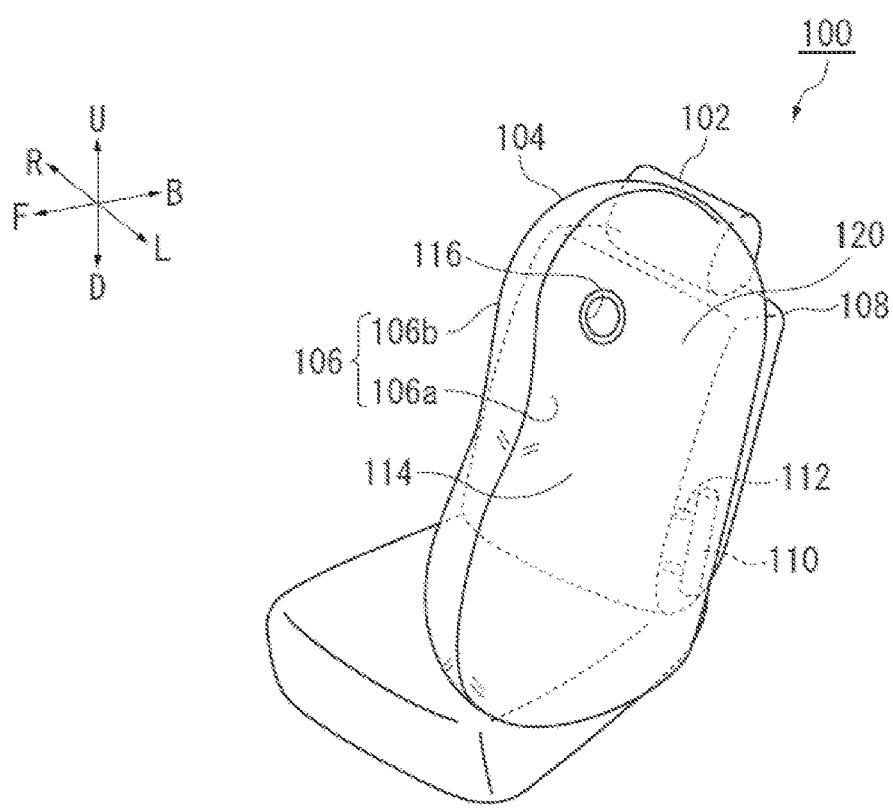
FIG. 1 is a diagram that exemplarily shows a side airbag device according to a first embodiment of the present invention.

L1—Length of Tether, L2—Distance between Connection and Tether Cutter, M1—Area being overlapped with Cushion Protruding Part, 100—Side Airbag Device according to First embodiment, 102—Seat, 104—Cushion, 106—Main Panel, 106a—Main Panel on the Left Side in Vehicle Width Direction, 106b—Main Panel on the Right Side in Vehicle Width Direction, 108—Seat Back, 110—Inflator, 112—Stud Bolt, 114—Side Surface of Cushion Main Body, 116—Vent Hole, 120—Cushion Main Body, 122—Cushion Protruding Part, 124—Tether, 126—Tether Cutter, 128—Connector, 130—Connection of Tether, 132—Sensor, 134—Control Unit, 150—Airbag Device according to Second embodiment, 152—Cushion, 154—Protruding Vent, 156—Opening, 158—Tether, 160a, 160b—Ends of Tether, 162a, 162b—Outer Peripheral Sewing Parts, 164—Tack-In, 180—Cushion, 182—Protruding Vent, 200—Airbag Device according to Third embodiment, 202—Cushion, 204—Tether, 206—Tether Guide, 208a—Side Part of the Right Side in Vehicle Width Direction of Cushion Protruding Part, 208b—Side Part of the Left Side in Vehicle Width Direction of Cushion Protruding Part, 220—Airbag Device according to Fourth embodiment, 222—Cushion, 224—Vent Cover, 240—Airbag Device according to Fifth embodiment, 242—Cushion, 244—Vent Hole, 246—Connection of Tether, 260—Airbag Device according to Sixth embodiment, 262—Cushion, 264—Side Vent, 280—Airbag Device according to Seventh embodiment, 282—Cushion, 284—Vent Hole, 300—Side Airbag Device according to Eighth embodiment, 302—Cushion, 304—Inner Bag, 306a—Inner Vent at Top Portion, 306b—Inner Vent at Bottom Portion, 308—Tether, 310—Branching Tether, 320—Side Airbag Device according to Ninth embodiment, 322—Folded Back Part, 324—Slit, 326—Cushion, 340—Side Airbag Device according to Tenth embodiment, 342—Patch, 342a—First Component of Patch, 342b—Second component of Patch, 344—Cushion, 346—Edge of First Component, 348—Projecting Piece, 360—Knot Part, 370—Patch in Variation, 372—Hole, 374—Projecting Piece, 400—Side Airbag Device according to Eleventh embodiment, 402—Reinforcement, 404—Cushion, 420—Side Airbag Device according to Twelfth embodiment, 422—Reinforcement, 422a—First Component of Reinforcement, 422b—Second Component of Reinforcement, 424—Cushion, 426—Other Reinforcement, 426a—First Component of Reinforcement, 426b—Second Component of Reinforcement, 440—Side Airbag Device according to Twelfth embodiment, 442—Reinforcement, 444—Two-component Conjugate Fiber, 446—single component fiber, 448—Cushion, and 460—Reinforcement in Variation.

Mode for Carrying Out the Invention

Preferred embodiments of the present invention will be explained in detail with reference to the attached drawings below. The dimensions, materials, other concrete numerical values, and other that are disclosed in the embodiments are merely examples for facilitating understanding of the invention, and unless otherwise stated, they are not limited the present invention. Further, in this specification and the drawings, with respect to the elements having substantially the same functions and configurations, redundant explanations are omitted by accompanying the same reference numerals. Further, the elements that are not directly related to the present invention are not shown in the drawings.

First Embodiment

FIG. 1 is a diagram that exemplarily shows a side airbag device 100 according to a first embodiment of the present invention. FIG. 1A exemplarily shows the side airbag device 100 and a seat 102 that is on the left side of a vehicle and in which the side airbag device 100 is utilized viewed from a left side in a vehicle width direction. In the following disclosures, with respect to FIG. 1A and all other diagrams according to the present invention, the vehicle front and rear (longitudinal) directions respectively denote the arrows F (Forward) and B (Back), the crosswise directions that correspond to an interior side and an exterior side in the vehicle width direction respectively denote the arrows L (Left) and R (Right), and the vehicle vertical directions respectively denote the arrows U (Up) and D (Down).

As shown in FIG. 1A, the side airbag device 100 has a configuration in which an airbag cushion (a cushion 104) is expanded and deployed from an inside of a seat back 108 of the seat 102. The cushion 104 is the portion in which the occupant is restrained in an emergency and is housed in a side part of the seat back 108 in the vehicle width direction in the state of being wound or folded prior to its operation. Thereafter, by detecting the impact of the vehicle, the expansion and the deployment are performed from the side part toward the vehicle front side by utilizing a gas.

In the present embodiment, the cushion 104 is provided on the left side of the seat back 108, however, it is possible that the cushion 104 is provided on the right side. That is, the cushion 104 can be provided either at the side part on the door side (near side) or at the side part of the interior side (far side) of the seat back 108.

The cushion 104 is formed in a flat shape as a whole. An outside surface of the cushion 104 is configured with a main panel 106 (a vehicle exterior side main panel 106a, a vehicle interior side main panel 106b). The main panel 106 is obtained from a base cloth and is formed in a bag shape as a whole by a sewing or an adhesion. Further, the cushion 104 can also be formed by the spinning and weaving by the utilization of OPW (One-Piece Woven).

An inflator 110 is installed inside of the cushion 104. The inflator 110 is a gas generator and a cylinder type (a cylindrical type) is adopted in the present embodiment. The inflator is electrically connected to the vehicle side and is operated by receiving a signal caused by the detection of the impact from the vehicle side so as to supply the gas to the cushion 104. The inflator 110 has a stud bolt 112 that is fastened to the seat back 108. Because the stud bolt 112 is fastened to the seat back 108 by penetrating through the cushion 104, the cushion 104 is also attached to the seat back 108.

There are some kinds of the inflators, such as a model in which a gas generating agent is charged and a gas is generated by burning the gas generating agent, a model in which a compressed gas is filled and a gas is supplied without generating heat, or a hybrid model in which a combustion gas and a compressed gas are used as an inflator spread through the market at the present time. Any kinds of the inflators can be utilized as the inflator 110.

A vent hole 116 is provided in a side surface 114 of the cushion 104 at the vehicle exterior side that is an opposite side of the occupant. The vent hole 116 discharges the gas, which is supplied from the inflator 110, from the inside of the cushion 104.

The side airbag device 110 according to the present embodiment can adjust the internal pressure of the cushion 104 according to the collision speed or the physique of the occupant at the vehicle collision. In general, when the collision speed in the horizontal (sidewise) direction is high at the time of the side collision, the moving speed in the horizontal direction of the occupant becomes high and the load that the occupant receives tends to be increased during the restraint of the occupant by the cushion 104. Similarly, even for the petite occupant, the tolerance for the collision energy is expected to be low. Accordingly, in the present embodiment, when the injury value for the occupant is expected to become high such as when the collision speed in the horizontal direction is higher than the predetermined value or when the physique of the occupant is less than the predetermined value, it is possible that the internal pressure of the cushion 104 is reduced.

Figure 1B:
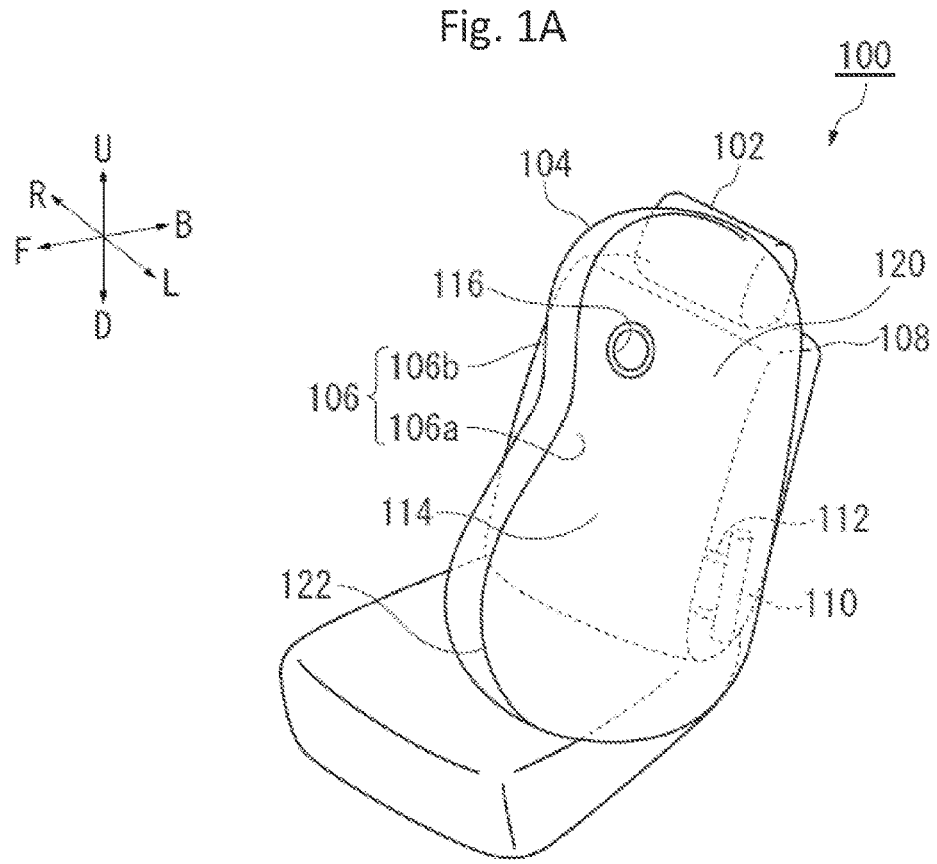

FIG. 1B exemplarily shows the cushion 104 when the injury value for the occupant is expected to become high during the restraint. The cushion 104 in the present embodiment has the configuration in which when the collision speed is higher than the predetermined value or when the physique of the occupant is less than the predetermined value, a cushion protruding part 122 is also expanded and deployed. Because the capacity of the entire cushion 104 increases by the expansion and the deployment of the cushion protruding part 122, the internal pressure of the cushion 104 can be relatively reduced.

Figure 2A:
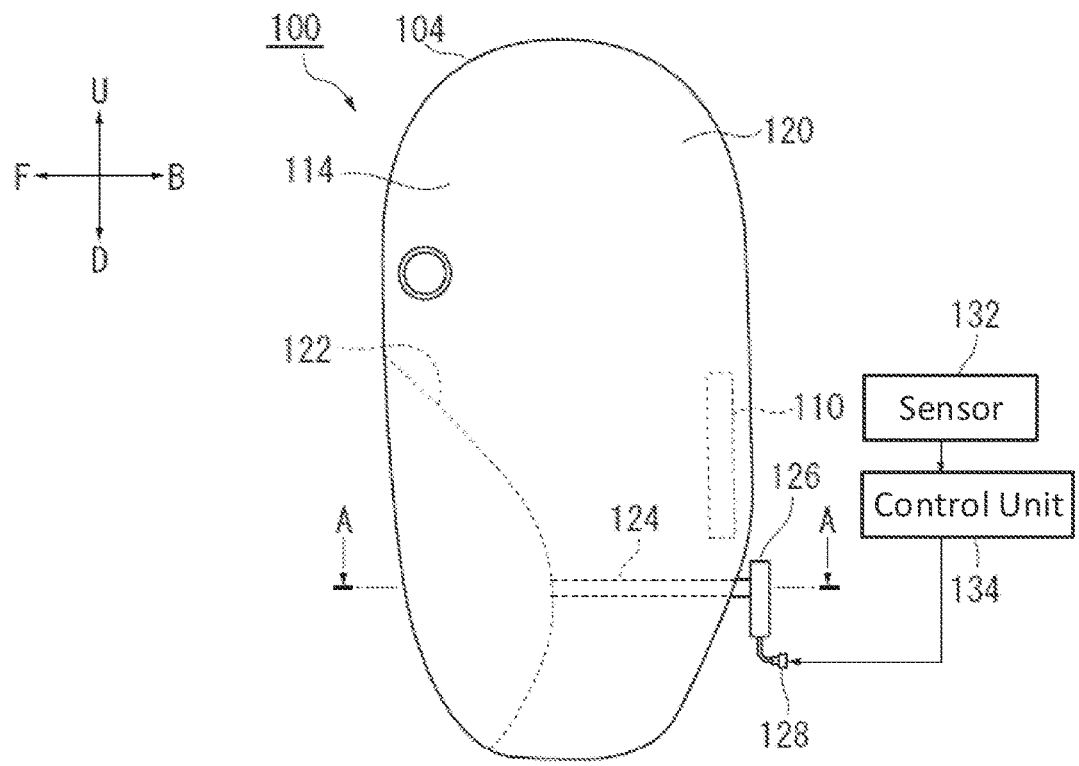
FIG. 2 is a diagram that exemplarily shows each cushion shown in FIG. 1 viewed from a left side in a vehicle width direction.

FIG. 2 is a diagram that exemplarily shows each of the cushions 104 shown in FIG. 1 viewed from a left side in the vehicle width direction. FIG. 2A exemplarily shows the cushion 104 shown in FIG. 1A while transmitting the inside. First, a cushion main body 120 configures a main area of the cushion 104 and is a portion of being expanded and deployed toward the side of the occupant being seated on the seat 102 (refer to FIG. 1A).

The cushion protruding part 122 is provided on the lower side of the vehicle front side of the cushion main body 120. Before the cushion 104 is expanded and deployed and when the collision speed is less than the predetermined value, the cushion protruding part 122 is reversed toward the side of the cushion main body 120 at the vehicle rear side and is folded back so as to be embedded into the inside of the cushion main body 120.

A string-like tether 124 is connected to the cushion protruding part 122. The tether 124 is a portion in which the expansion and the deployment of the cushion protruding part 122 is prevented when the collision speed is less than the predetermined value, and the tether 124 maintains the cushion protruding part 122 in a state of being folded back by pulling the cushion protruding part 122 toward the vehicle rear side at the time of the expansion and the deployment. The tether 124 bridges over a tether cutter 126 passing through the inside of the cushion main body 120.

The tether cutter 126 is small, has a cylindrical shape, and is provided at a predetermined position of the side part of the seat 102 (refer to FIG. 1A) together with such as the cushion 104. A cylinder (not shown) having a cutting edge and a micro gas generator (not shown) are provided inside of the tether cutter 126. The tether cutter 126 is electrically connected to such as a power source and a sensor 132 of the vehicle side by a connector 128, and the cutting edge moves according to the detection result of the sensor 132. The tether 124 is passed through a hole (not shown) of the tether cutter 126 and is fastened to the tether cutter 126.

The sensor 132 is provided at various places of the vehicle, measures and detects the states of the vehicle, and obtains the various predetermined information from the vehicle. As the sensor 132, various sensors can be utilized, for instance, a sensor for the side collision that detects the collision speed in the vehicle horizontal direction by being provided at the side part of the vehicle, a sensor for the front collision that detects the collision speed in the vehicle longitudinal direction by being provided at the front part of the vehicle, and a weight detection sensor that detects the weight or the physique of the occupant by being provided at the seat.

A control unit 134 processes each information that is obtained by the sensor 132 and controls the movability of the tether cutter 126 according to the predetermined condition (for instance, whether the collision speed in the horizontal direction is higher or lower than the predetermined value). The control unit 134 can also be utilized by multiply processing the detection results of a plurality of sensors, and as a result, the various information such as the collision speed, the collision angle, the collision energy, and the physique of the occupant at the vehicle collision are calculated, and it is possible to decide whether a movability signal is sent to the tether cutter 126 or not subject to the above calculated information.

Figure 2B:
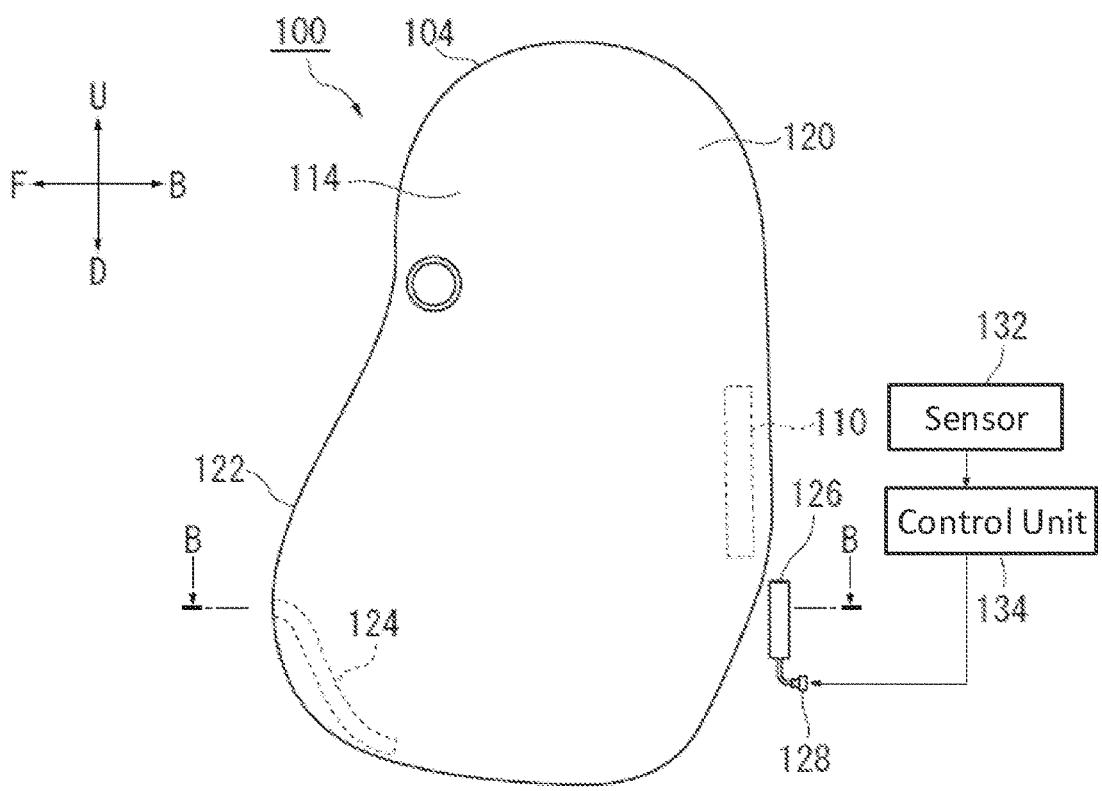

FIG. 2B is a diagram that exemplarily shows the cushion 104 shown in FIG. 1B viewed from the left side in the vehicle width direction. In the present embodiment, when the injury value for the occupant is expected to become high during the restraint, the control unit 134 sends an operation signal to the tether cutter 126 so that the tether 124 is cut by moving a cutting edge inside the tether cutter 126. As a result, the cushion protruding part 122 receives the gas from the cushion main body 120 and is further projected from the cushion main body 120 toward the vehicle front side and is expanded. Therefore, because the capacity of the entire cushion 104 increases, the internal pressure and the rigidity of the cushion main body 120 can be relatively reduced.

Figure 3A:
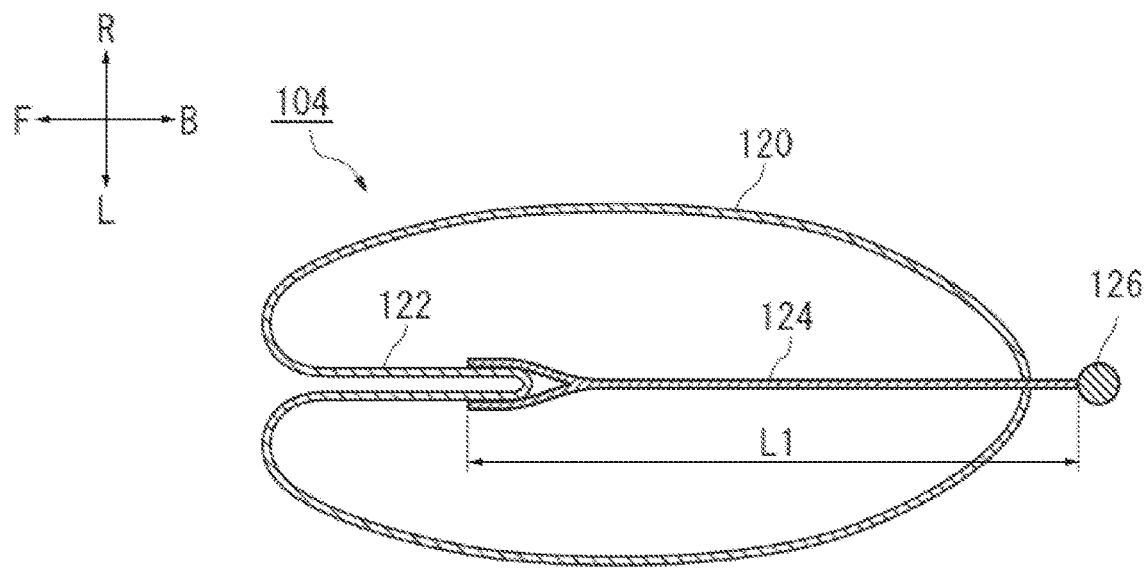
FIG. 3 is a cross sectional view of each cushion shown in FIG. 2.

The internal configuration of the cushion 104 will be explained again below with reference to FIG. 3. FIG. 3 is a cross sectional view of each of the cushions shown in FIG. 2. FIG. 3A is a cross sectional view along the A-A line of the cushion 104 shown in FIG. 2A. When the collision speed in the horizontal direction is less than the predetermined value or when the physique of the occupant is more than the predetermined value, the injury value for the occupant is expected to become low during the restraint by the cushion main body 120. In this case, the tether cutter 126 does not move. Therefore, because the cushion protruding part 122 is pulled toward the vehicle rear side by the tether 124, the cushion protruding part 122 is not expanded and deployed. As a result, the capacity of the entire cushion 104 is suppressed and the cushion main body 120 is further thickly expanded in the vehicle width direction at the high internal pressure. Because the load that the occupant, who has the lower moving speed or who is the large occupant, receives from the cushion main body 120 is also small, the cushion main body 120 can sufficiently perform the high restraining function.

Figure 3B:
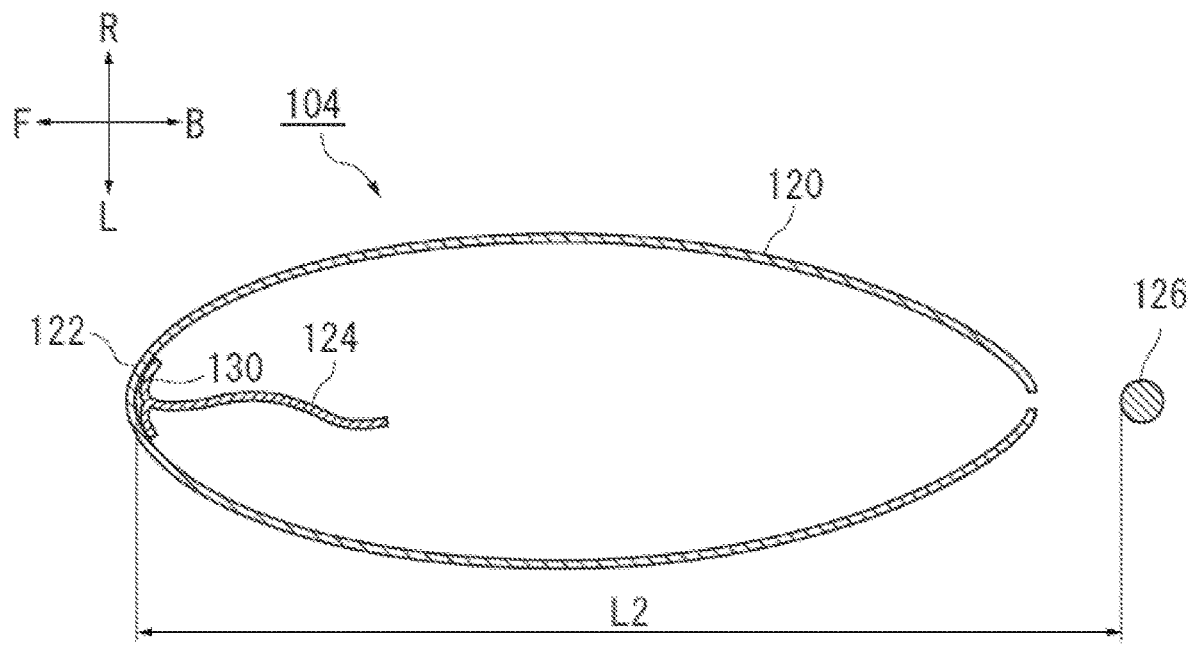

The tether 124 shown in FIG. 3A has a length L1 that is shorter than a distance L2 that corresponds to a distance between a connection 130 on the cushion protruding part 122 and the tether cutter 126 at the time of the expansion and the deployment of the cushion protruding part 122 exemplarily shown in FIG. 3B (L1>L2). When the collision speed is less than the predetermined value, the tether 124 having the length L1 suitably pulls the cushion protruding part 122 in order not to be expanded and deployed so that the state of being folded back of the cushion protruding part 122 can be maintained.

FIG. 3B is a cross sectional view along the B-B line of the cushion 104 shown in FIG. 2B. When the collision speed in the horizontal direction is higher than the predetermined value or when the physique of the occupant is less than the predetermined value, the injury value for the occupant is expected to become high during the restraint by the cushion main body 120. In this case, the tether 124 is cut by the movement of the tether cutter 126 so that the cushion protruding part 122 projects toward the vehicle front side and is expanded. Because the capacity of the entire cushion 104 increases by the expansion and the deployment of the cushion protruding part 122, the internal pressure of the cushion main body 120 can be suppressed. Therefore, because the rigidity of the cushion main body 120 is also reduced, the load that can be given to the occupant, who has the higher moving speed or who is the petite occupant, can be suppressed.

The example of the control of the tether cutter 126 with a focus on the control unit 134 shown in FIG. 2A will be explained in detail. As explained above, the control unit 134 can control the tether cutter 126 based on the information that is obtained by the sensor 132.

For instance, the control unit 134 may control the tether cutter 126 subject to the collision speed. In the side collision, when the collision speed in the vehicle horizontal direction is high, the moving speed in the horizontal direction of the occupant also becomes high and there is a possibility that the injury value becomes high during the restraint by the cushion main body 120. Accordingly, when the collision speed that is obtained by the sensor for the side collision is equal to or higher than the predetermined threshold value (for instance: 30 km/h), the control unit 134 can determine to send the movability signal to the tether cutter 126. As a result, as exemplarily shown in FIG. 3B, because the cushion protruding part 122 is expanded and deployed by cutting the tether 124, the internal pressure of the cushion main body 120 is reduced. On the contrary, the collision speed is less than the threshold value, the control unit 134 determines not to send the movability signal to the tether cutter 126. As a result, as exemplarily shown in FIG. 3A, because the tether 124 is not cut, the tether 124 prevents the cushion protruding part 122 from being expanded and deployed so that the internal pressure of the cushion main body 120 is kept high.

As another example for the control, the control unit 134 can also control the tether cutter 126 subject to the physique of the occupant. In case of the petite occupant, because the tolerance for collision energy is expected to be low, there is a possibility that the injury value becomes high during the restraint by the cushion 104. Accordingly, when the information regarding the physique of the occupant that is obtained by the weight detection sensor at the seat is less than the predetermined threshold value (for instance: the physique of the adult male), the control unit 134 can determine to send the movability signal to the tether cutter 126. As a result, as exemplarily shown in FIG. 3B, because the cushion protruding part 122 is expanded and deployed by cutting the tether 124, the internal pressure of the cushion main body 120 is reduced. On the contrary, when the physique of the occupant is equal to or more than the threshold value, the control unit 134 determines not to send the movability signal to the tether cutter 126 because the tolerance for collision energy is expected to be high. As a result, as exemplarily shown in FIG. 3A, because the tether 124 is not cut, the tether 124 prevents the cushion protruding part 122 from being expanded and deployed so that the internal pressure of the cushion main body 120 is kept high.

Further, as the concrete example for the judgement of the physique of the occupant, for instance, it is possible to utilize a dummy doll AM50 (corresponds to a male of 50th percentile, the height is 175 cm and the weight is 78 kg) shaped like the physique that conforms the 50% of the average United States adult males for testing as the threshold value.

As yet another example for the control, the control unit 134 can control the tether cutter 126 by modifying the threshold value according to the physique of the occupant. Even by the same collision speed, if the physiques of the occupant are different, the injury values fluctuate. Accordingly, for instance, when the physique of the occupant is determined to correspond to the petite woman, it is also possible that the control unit 134 considers that the tolerance to the impact energy is low so as to reduce the threshold value of the collision speed and determines to move the tether cutter 126 so as to suppress the internal pressure of the cushion main body 120 low even though the collision speed is low. Further, for instance, when the physique of the occupant is determined to correspond to the adult male, it is also possible that the control unit 134 considers that the tolerance to the impact energy is high so as to increase the threshold value of the collision speed and determines not to move the tether cutter 126 so as to maintain the internal pressure of the cushion main body 120 high even though the collision speed is high.

Further, in the present embodiment, the information regarding the collision angle (an approach angle of an object with respect to the vehicle longitudinal direction) can also be obtained by utilizing such as the sensor for the front collision and the other collision detection sensor. For instance, when the vehicle is collided at the angle of being not the mere longitudinal direction and horizontal direction such as an oblique collision and an offset collision, there is a case in which a smaller value than an actual value of the collision speed that is actually applied to the occupant is obtained when the collision speed for only in the longitudinal direction or the horizontal direction is measured. As a result, it means that in case of such as the oblique collision, as compared with the cases of the front collision and the side collision, the higher value is relatively set even the same threshold value. Accordingly, when the collision speed that is applied to the occupant is calculated by also obtaining the collision angle as explained above, it becomes possible that the tether cutter 126 is controlled by accurately matching the actual collision speed.

As explained above, according to the side airbag device 100, it is possible that the internal pressure of the cushion 104 is adjusted according to the various conditions such as the collision speed, the collision angle, the physique of the occupant, and collision energy at the vehicle collision. As a result, it is possible that the occupant is efficiently restrained without the increase of the injury value for the occupant.

Second Embodiment

FIG. 4 is a diagram that exemplarily shows an airbag device 150 according to a second embodiment of the present invention. In the configuration of a cushion 152, the airbag device 150 is different from the airbag device 150 exemplarily shown in FIG. 1. In the following descriptions, with respect to the elements that are already explained, the explanations thereof are omitted by accompanying the same reference numerals. Further, if there are the elements that have different reference numerals and if these elements have the same names with the elements that are already explained, the basic configuration and functions of these elements are the same.

Figure 4A:
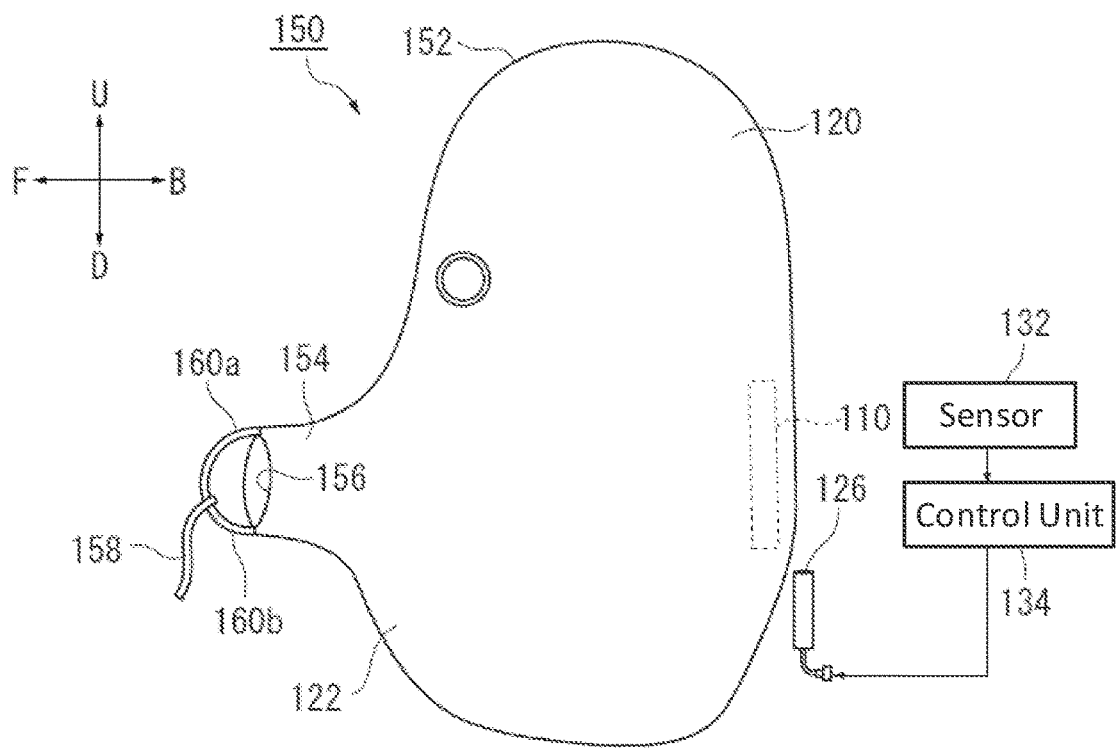
FIG. 4 is a diagram that exemplarily shows an airbag device according to a second embodiment of the present invention.

FIG. 4A, which corresponds to FIG. 2B, exemplarily shows the cushion 152 when the injury value for the occupant is expected to become high during the restraint. With respect to the cushion 152, a protruding vent 154 is provided at the cushion protruding part 122. The protruding vent 154 is provided in the cylindrical shape at the tip (leading end) of the vehicle front side of the cushion protruding part 122 and has an opening 156 that opens toward the vehicle front side at the time of the expansion and the deployment of the cushion 152. Ends 160a and 160b in a bifurcated shape of a tether 158 are connected to the upper and lower ends of the protruding vent 154.

Figure 4B:
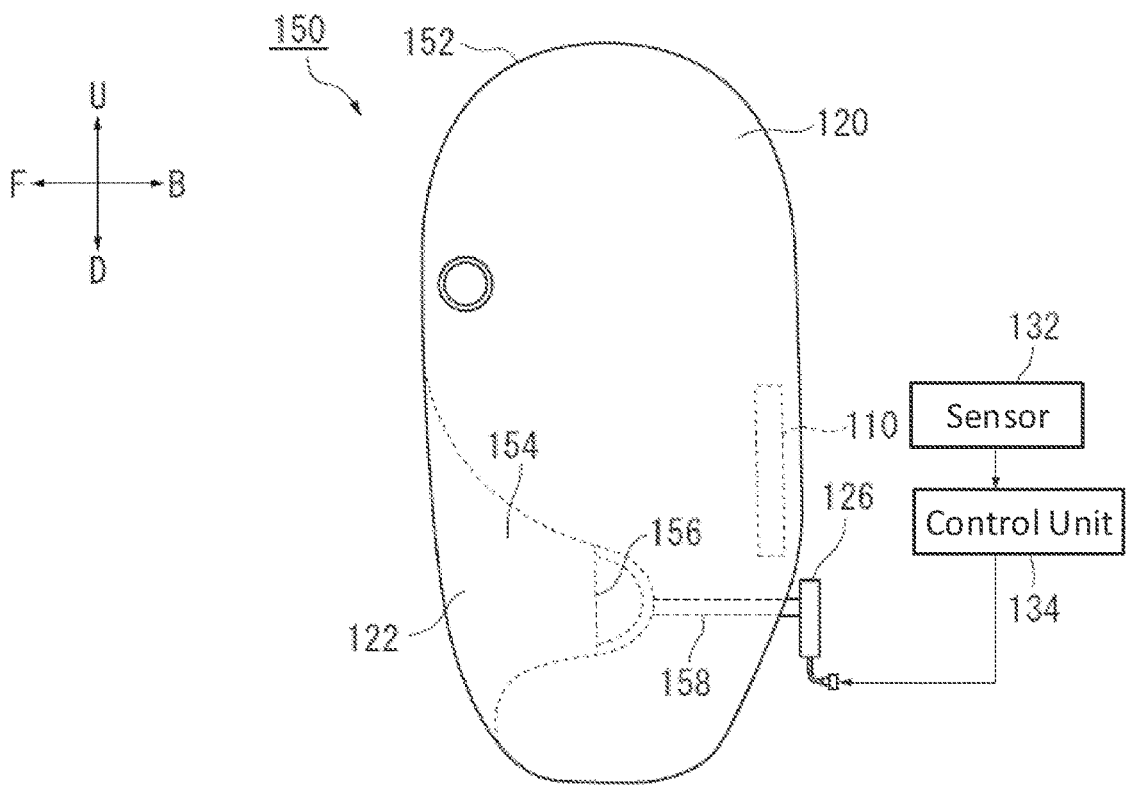

FIG. 4B exemplarily shows the cushion 152 when the injury value for the occupant is expected to become low during the restraint. The protruding vent 154 is also reversed to the side of the cushion main body 120 together with the cushion protruding part 122 and is folded back so as to be embedded into the inside of the cushion main body 120.

With respect to the airbag device 150, by providing the protruding vent 154, when the injury value for the occupant is expected to become high during the restraint, the discharge amount of the gas from the cushion 152 increases. Therefore, the internal pressure of the entire cushion 152 and the load that can be given to the occupant can be further suppressed.

Figure 5A:
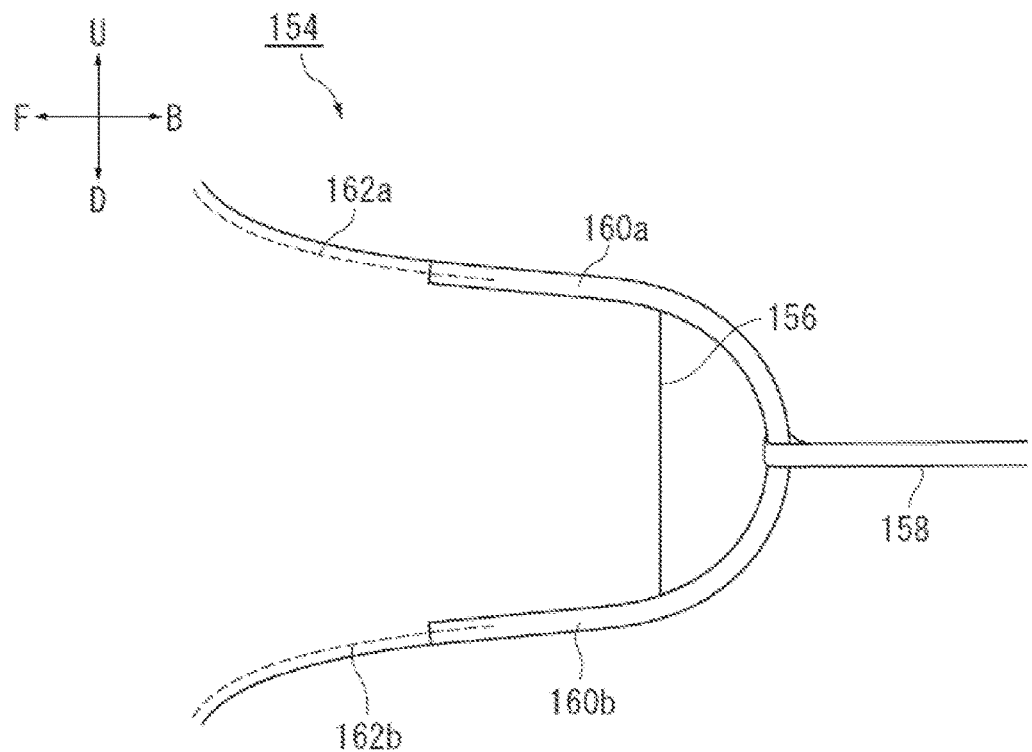
FIG. 5 is an enlarged view that exemplarily shows a protruding vent shown in FIG. 4B.

FIG. 5 is an enlarged view that exemplarily shows the protruding vent 154 shown in FIG. 4B. As exemplarily shown in FIG. 5A, outer peripheral sewing parts 162a and 162b are provided at the cushion 152. The outer peripheral sewing parts 162a and 162b correspond to portions that are provided along the outer periphery of the cushion protruding part 122 viewed from the vehicle width direction and in which the base cloth(s) of the cushion protruding part 122 is (are) sewed together in the vehicle width direction. The ends 160a and 160b in the bifurcated shape of the tether 158 on the side of the cushion protruding part 122 are respectively sewed together with the outer peripheral sewing parts 162a and 162b on the top and bottom of the protruding vent 154 without overlapping with each other. According to the configuration explained above, the tether 158 can be connected to the cushion protruding part 122 in a concise manner.

Figure 5B:
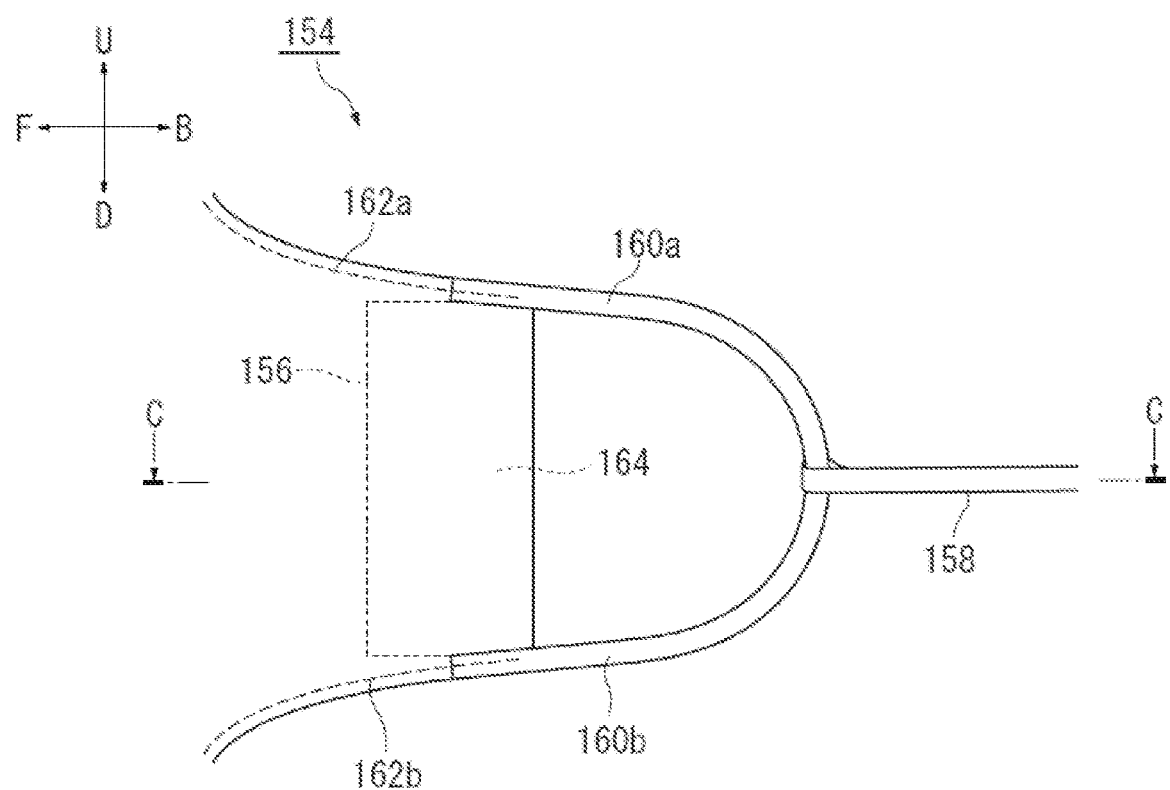

FIG. 5B is a diagram in which the opening 156 of the protruding vent 154 shown in FIG. 5A is folded back. The opening 156 of the protruding vent 154 is the tip of the cushion protruding part 122 and can be mounted on the vehicle by being folded back so as to face the vehicle front side again. In particular, in the present embodiment, a tack-in 164 is provided by folding the opening 156 back. In order to being able to form the tack-in 164, the outer peripheral sewing parts 162a and 162b shown in FIG. 5A are not provided to the tip of the protruding vent 154.

Figure 6A:
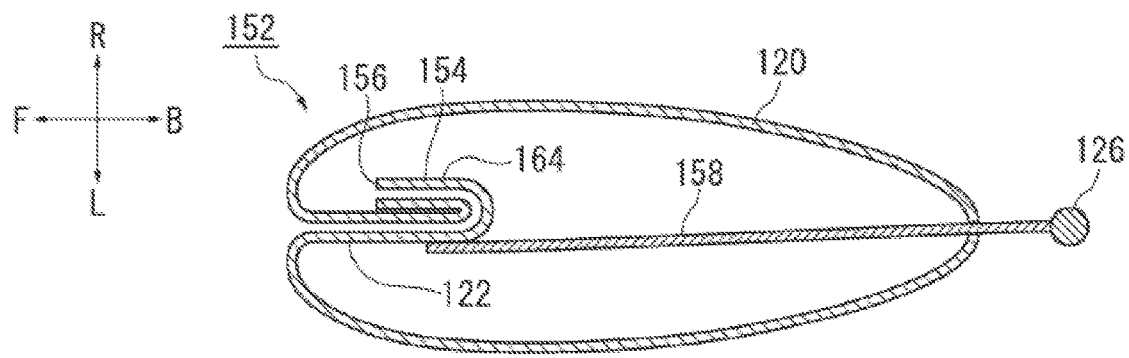
FIG. 6 is a diagram that exemplarily shows a process in which the cushion shown in FIG. 5B is expanded and deployed.
Figure 6B:
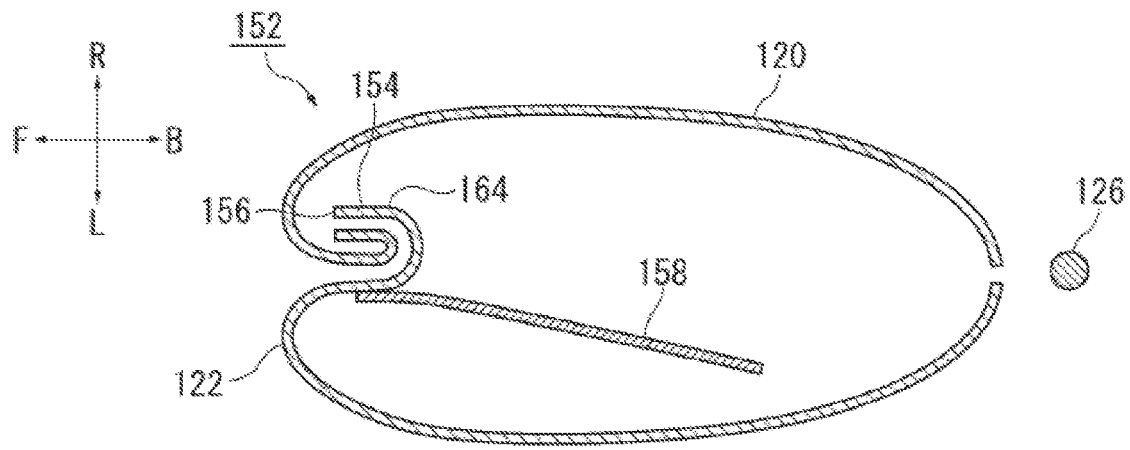
Figure 6C:
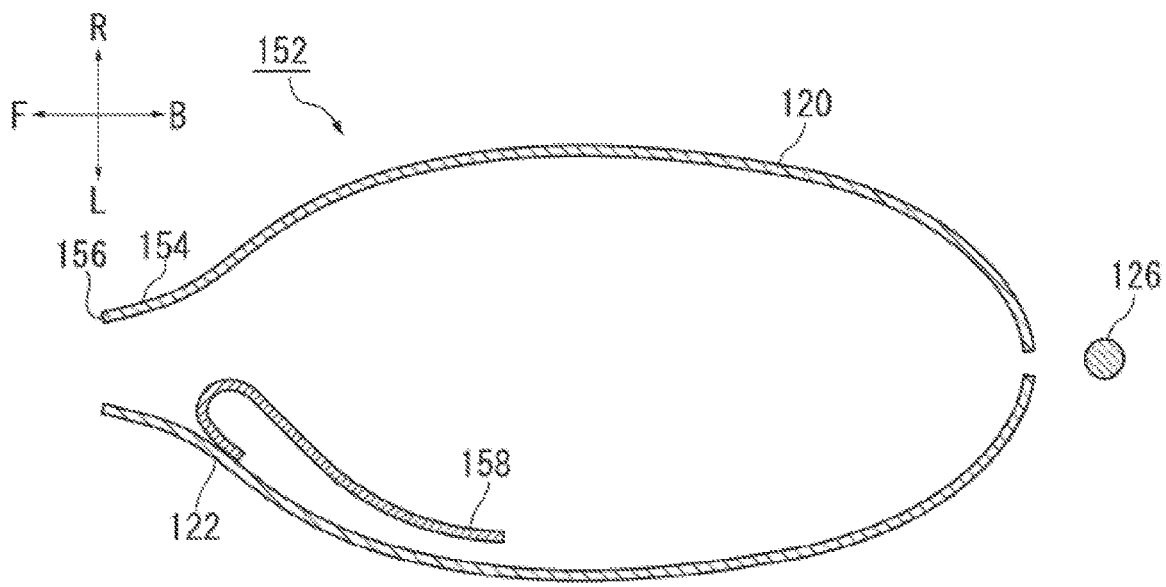

FIG. 6 is a diagram that exemplarily shows a process in which the cushion 152 shown in FIG. 5B is expanded and deployed. FIG. 6A is a cross sectional view along the C-C line of the cushion 152 shown in FIG. 5B. As exemplarily shown in FIG. 6A, when the tack-in 164 is provided and it is mounted on the vehicle, the opening 156 of the protruding vent 154 is folded back and is expanded and deployed by facing the vehicle front side from the beginning. Therefore, the gas is hardly leaked from the opening 156. FIG. 6B is a diagram that exemplarily shows a state just after the cut of the tether 158 shown in FIG. 6A. The opening 156 faces the vehicle front side even at the time of the expansion and the deployment because the tack-in 164 is provided. Further, as exemplarily shown in FIG. 6C, when the folded-back and the reversal of the cushion protruding part 122 are canceled, the gas is discharged from the opening 156.

As explained above, the gas is hardly leaked from the opening 156 by providing the tack-in 164. According to this configuration, in a case in which the tether 158 is not cut, the expansion and the deployment can be performed by quickly filling the gas in the cushion main body 120.

Figure 7:
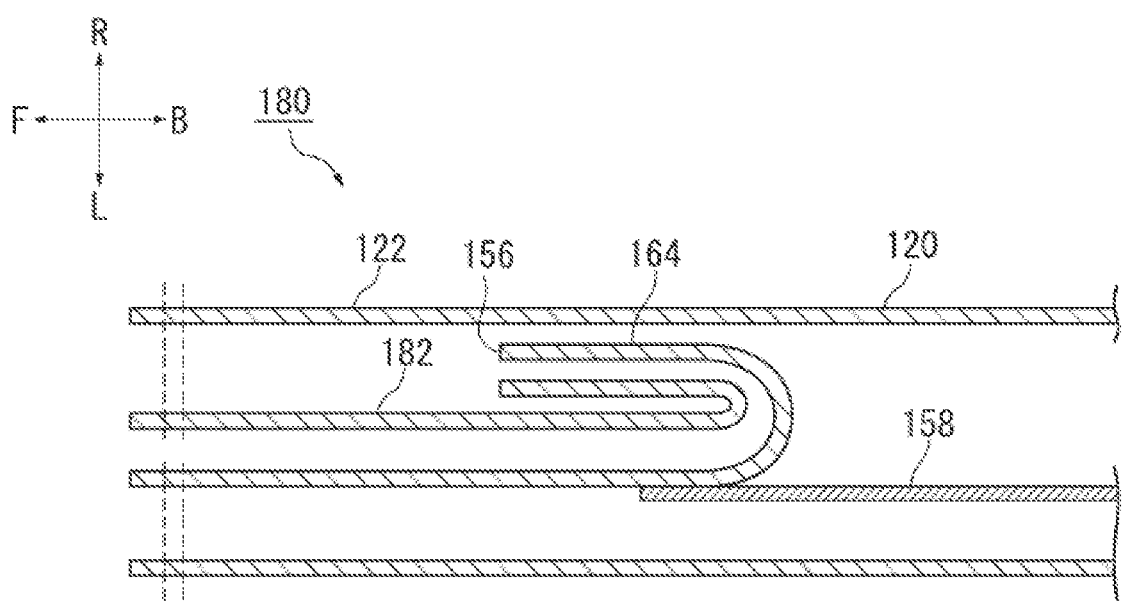
FIG. 7 is a diagram that exemplarily shows each variation of the cushion shown in FIG. 6A.

FIG. 7 is a diagram that exemplarily shows a variation of the cushion 152 shown in FIG. 6A. With respect to a cushion 180, a protruding vent 182 is configured by a base cloth that is independent from such as the cushion protruding part 122 and is provided at the cushion protruding part 122 by sewing. According to this configuration, the protruding vent 182 can also be suitably provided.

Third Embodiment

FIG. 8 is a diagram that exemplarily shows an airbag device 200 according to a third embodiment of the present invention. With respect to a cushion 202 of the airbag device 200, the cushion protruding part 122 and the protruding vent 154 are folded back to the exterior side (the left side in the vehicle width direction of the seat 102 located at the left side of the vehicle shown in FIG. 1A) in the vehicle width direction of the outside of the cushion main body 120. According to this configuration, when the injury value for the occupant is expected to become high during the restraint, such as the cushion protruding part 122 that is expanded and deployed can also be realized. Further, when the cushion 202 is provided at the side part of the right side (the interior side) in the vehicle width direction of the seat 102 (refer to FIG. 1A), such as the cushion protruding part 122 can also be provided by being folded back to the interior side.

With respect to the cushion 202, a tether guide 206 is provided on a side surface 114 to which the cushion protruding part 122 of the cushion main body 120 is folded back as a first retaining member through which a tether 204 passes. FIG. 8B is a cross sectional view along the D-D line of the cushion 202 shown in FIG. 8A. The tether guide 206 is provided on the side surface 114 of the cushion 202 in a loop shape by sewing. Because the tether 204 passes through the tether guide 206, the tether 204 can bridge over without being bent.

FIG. 8C is a cross sectional view along the E-E line of the cushion 202 shown in FIG. 8A. As exemplarily shown in FIG. 8C, the ends 160a and 160b of the tether 204 are connected to a side part 208a at the right side in the vehicle width direction and a side part 208b at the left side in the vehicle width direction of the cushion protruding part 122, not to the outer peripheral sewing parts 162a (refer to FIG. 5A). According to this configuration, the tether 204 can also be connected to the cushion protruding part 122 in a concise manner.

Fourth Embodiment

Figure 9A:
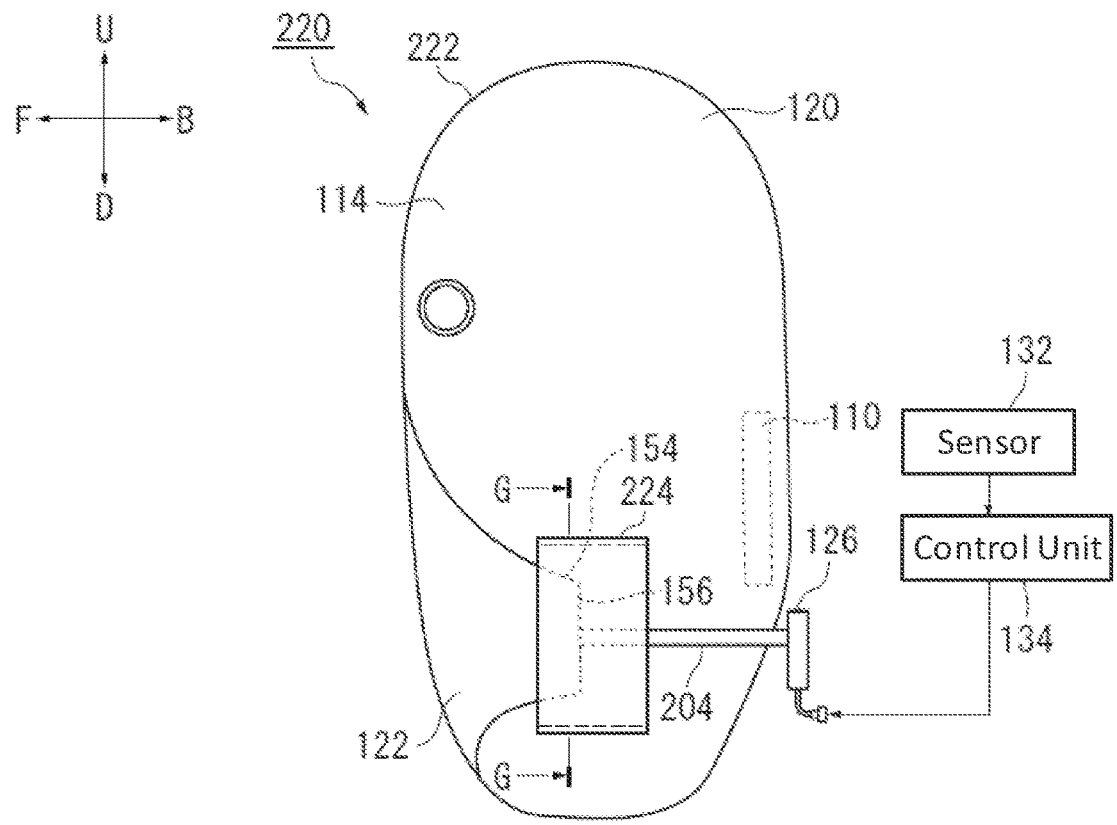
FIG. 9 is a diagram that exemplarily shows an airbag device according to a fourth embodiment of the present invention.

FIG. 9 is a diagram that exemplarily shows an airbag device 220 according to a fourth embodiment of the present invention. With respect to the airbag device 220 exemplarily shown in FIG. 9A, a vent cover 224 is provided on the side surface 114 on which the cushion protruding part 122 of the cushion main body 120 is folded back as a second retaining member in which the tip of the cushion protruding part 122 is inserted.

Figure 9B:
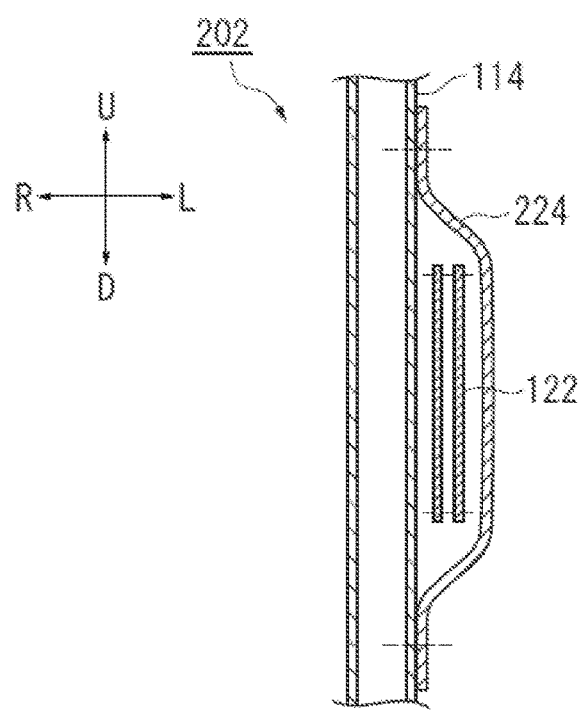

FIG. 9B is a cross sectional view along the G-G line of a cushion 222 shown in FIG. 9A. The vent cover 224 is provided on the side surface 114 of the cushion 222 in a loop shape by sewing. Because the cushion protruding part 122 is inserted in the vent cover 224, such as the fluttering can be prevented by holding the cushion protruding part 122.

Fifth Embodiment

Figure 10:
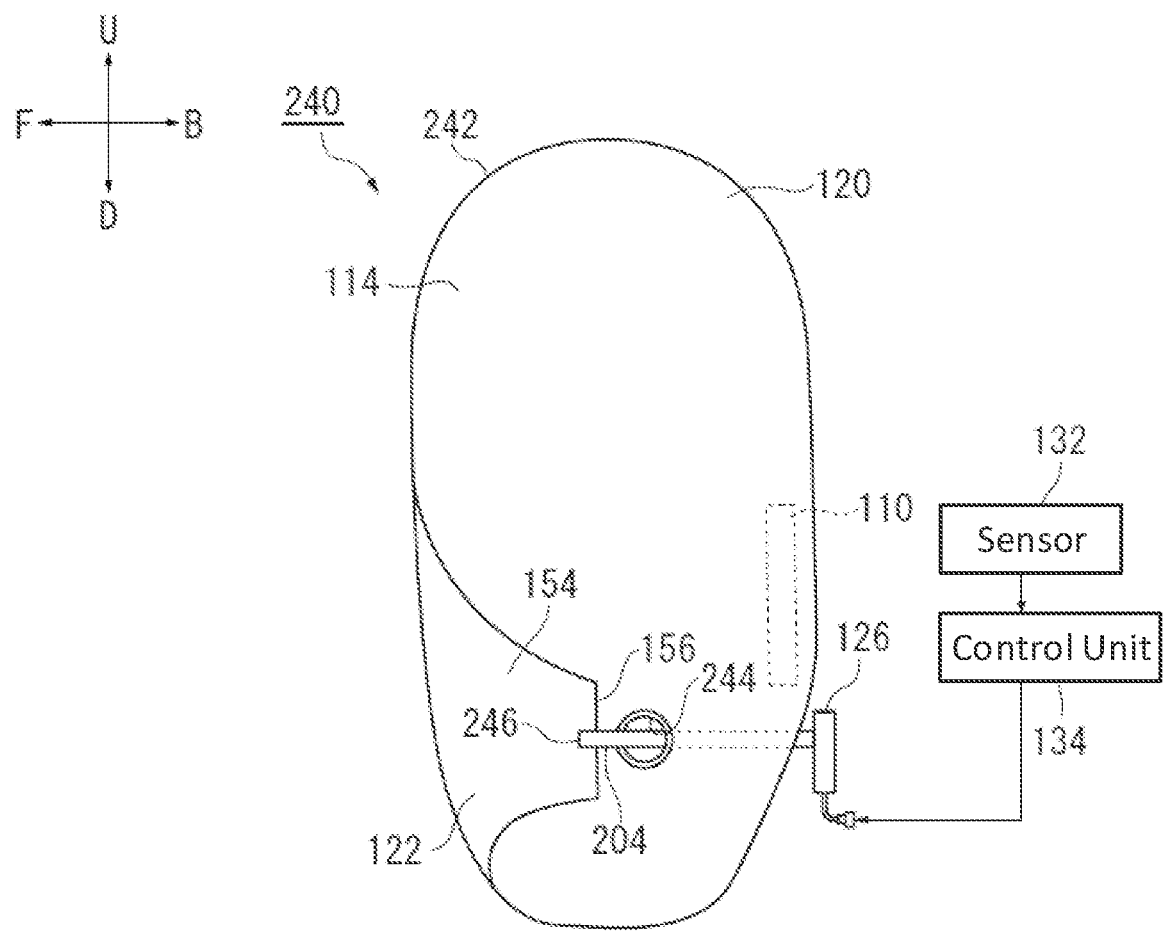
FIG. 10 is a diagram that exemplarily shows an airbag device according to a fifth embodiment of the present invention.

FIG. 10 is a diagram that exemplarily shows an airbag device 240 according to a fifth embodiment of the present invention. With respect to a cushion 242 of the airbag device 240 exemplarily shown in FIG. 10, a vent hole 244 as a predetermined side hole is provided in the vicinity of the tether 204 on the side surface 114 on which the cushion protruding part 122 of the cushion main body 120 is folded back. The tether 204 enters inside of the cushion main body 120 from the vent hole 244, passes through the inside of the cushion main body 120, and bridges over the tether cutter 126. Because the tether 204 passes through the vent hole 244, the tether 204 can also bridge over without being bent.

The vent hole 244 is provided on the path connecting linearly between a connection 246 of the tether 204 on the cushion protruding part 122 and the tether cutter 126. According to this configuration, the tether 204 can bridge over at the shortest distance.

Sixth and Seventh Embodiments

Figure 11A:
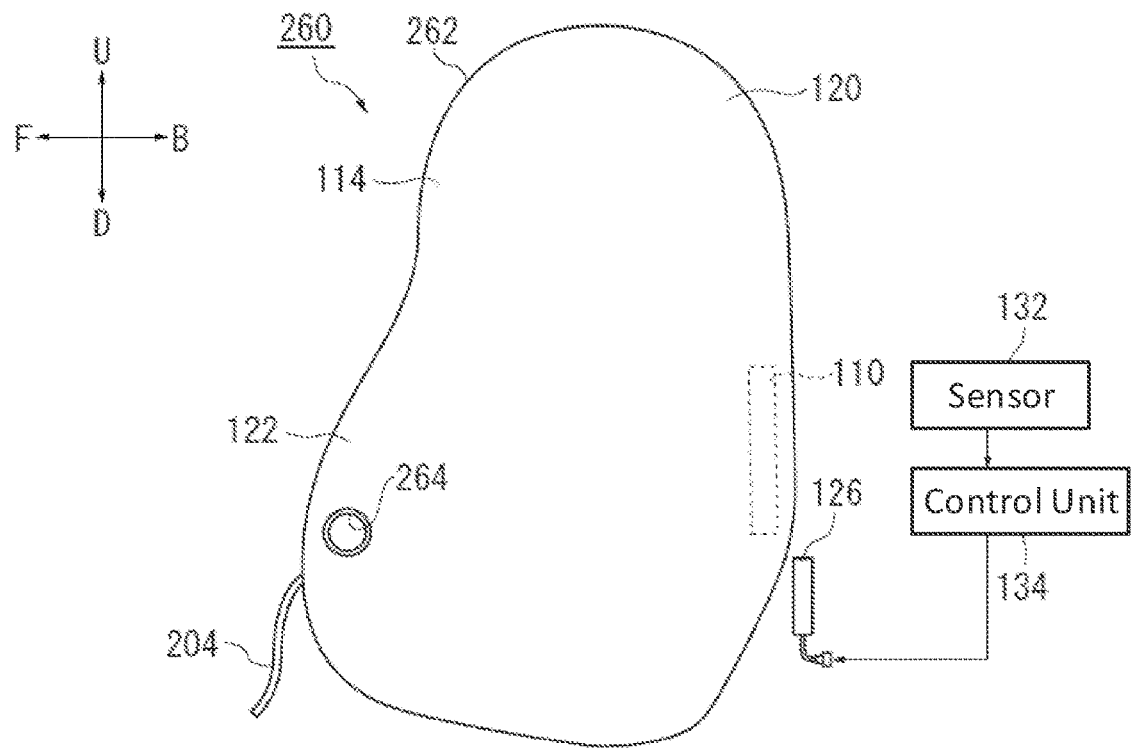
FIG. 11 is a diagram that respectively exemplarily shows the airbag device according to the sixth and seventh embodiments of the present invention.

FIG. 11 is a diagram that exemplarily shows airbag devices 260 and 280 according to sixth and seventh embodiments of the present invention, respectively. FIG. 11A is a diagram that exemplarily shows the airbag device 260 according to the sixth embodiment. A side vent 264 having an opening is provided on the side part at the left side in the vehicle width direction of the cushion protruding part 122 of a cushion 262 of the airbag device 260. The side vent 264 is also the portion for discharging the gas to the outside.

The side vent 264 in the cushion protruding part 122 is provided in an area in which the cushion main body 120 and the cushion protruding part 122 that is folded back to the vehicle rear side are overlapped. Therefore, before the tether 204 is cut, i.e., when the injury value for the occupant is expected to become low during the restraint, the discharge of the gas is suppressed because of the overlapping with the side surface of the cushion main body 120. Further, when the injury value for the occupant is expected to become high during the restraint, the side vent 264 discharges the gas because of the release from the overlapping with the cushion main body 120 together with the cut of the tether 204. Therefore, because the discharge of the gas can be promoted in addition to the expansion and the deployment of the cushion protruding part 122, the internal pressure of the entire cushion 262 can be further suppressed.

Figure 11B:
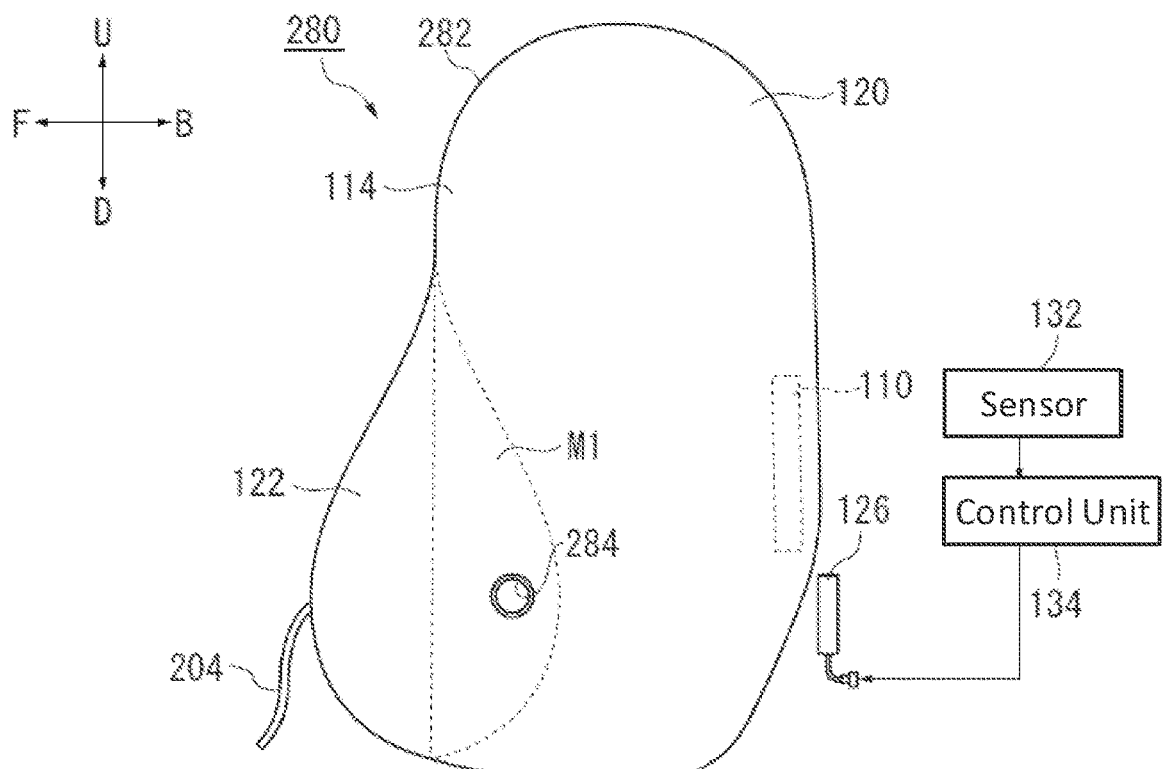

FIG. 11B is a diagram that exemplarily shows the airbag device 280 according to the seventh embodiment. A cushion 282 has a vent hole 284 having an opening in an area M1 of the cushion main body 120 on which the cushion protruding part 122 is folded back. By having the vent hole 284, before the tether 204 is cut, i.e., when the injury value for the occupant is expected to become low during the restraint, the discharge of the gas is suppressed because of the overlapping with the cushion protruding part 122. Further, when the injury value for the occupant is expected to become high during the restraint, the vent hole 284 discharges the gas because of the release from the overlapping with the cushion protruding part 122 together with the cut of the tether 204. Therefore, because the discharge of the gas can be promoted in addition to the expansion and the deployment of the cushion protruding part 122, the internal pressure of the entire cushion 282 can be further suppressed.

Further, when the cushion protruding part 122 is embedded into the inside of the cushion main body 120 and is reversed as exemplarily shown in FIG. 2A, the side vent 264 shown in FIG. 11A and the vent hole 284 shown in FIG. 11B can be respectively closed because the base cloth of the cushion protruding part 122 and the base cloth of the cushion main body 120 are overlapped with each other.

In each of the embodiments explained above, each of the tethers can be suitably connected to the outer peripheral sewing part (for instance, the outer peripheral sewing parts 162a and 162b shown in FIG. 5A) or the region of the base cloth other than the outer peripheral sewing part of each of the cushion protruding parts.

Figure 12:
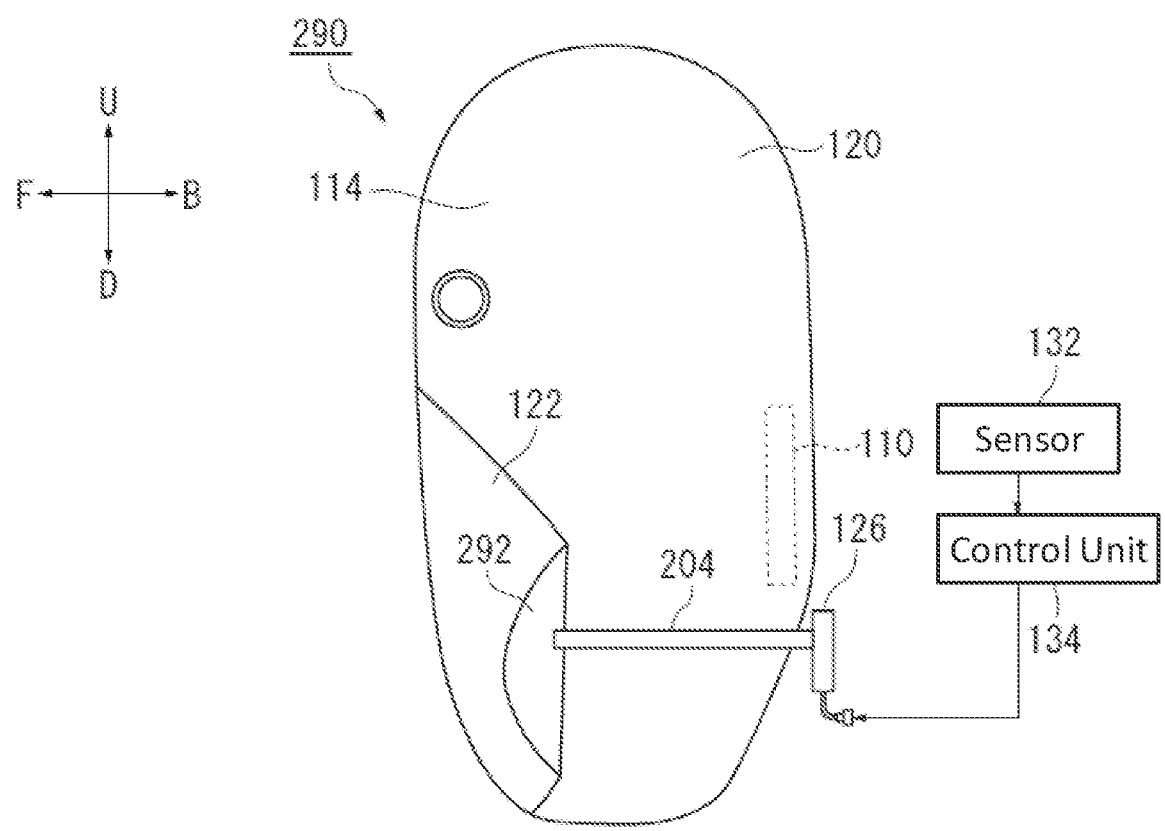
FIG. 12 is a diagram that exemplarily shows a variation of the cushion shown in FIG. 2A.

In FIG. 5B, the opening 156 of the protruding vent 154 is folded back to the vehicle front side after being reversed to the vehicle rear side, however, the cushion protruding part 122 that does not have the protruding vent 154 can also be folded back to the vehicle front side again after being folded back to the vehicle rear side. For instance, FIG. 12 is a diagram that exemplarily shows a variation of the cushion 104 shown in FIG. 2A. As shown in FIG. 12, with respect to a cushion 290, the cushion protruding part 122 in which the tip can be folded back to the vehicle front side again after being folded back to the left side in the vehicle width direction of the cushion main body 120. According to this configuration, the cushion protruding part 122 can also be mounted on the vehicle by being suitably folded.

Figure 13A:
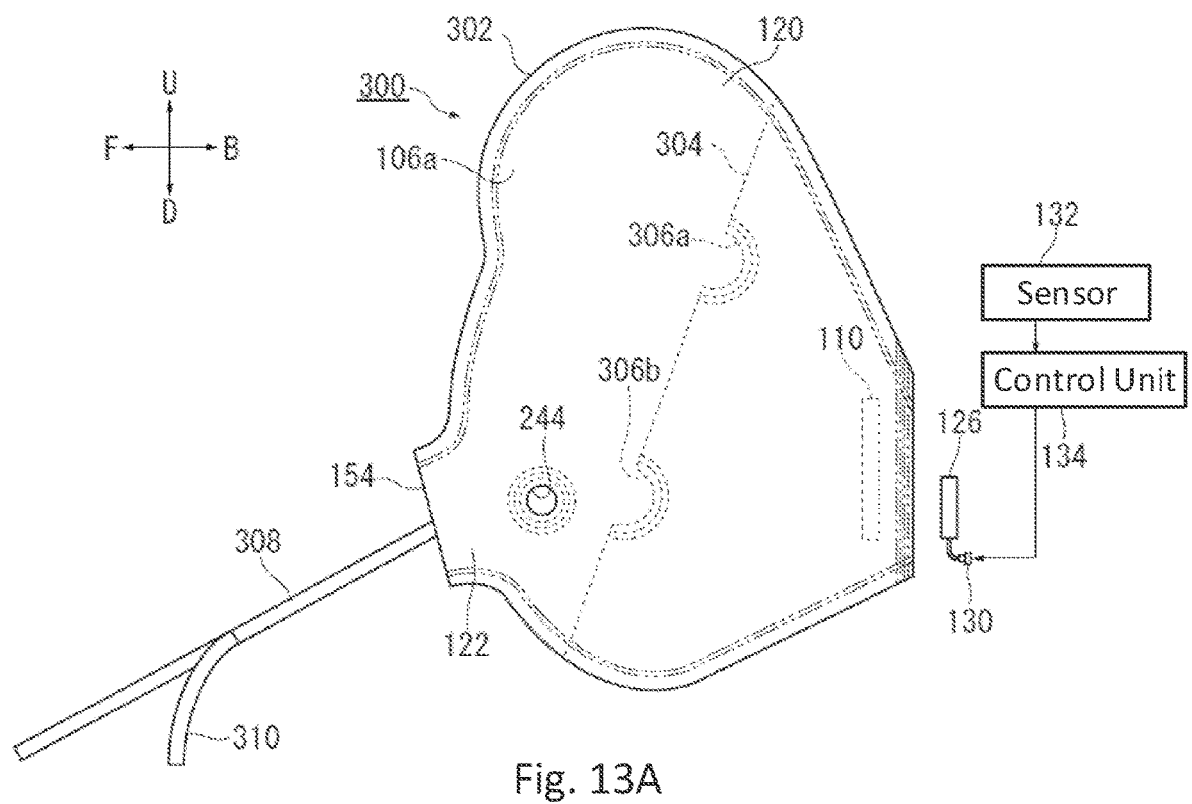
FIG. 13 is a diagram that exemplarily shows a side airbag device according to an eighth embodiment of the present invention.

FIG. 13 is a diagram that exemplarily shows a side airbag device 300 according to an eighth embodiment of the present invention. FIG. 13A is a diagram that exemplarily shows a cushion 302 viewed from the left side (the exterior side) in the vehicle width direction while transmitting the inside.

An inner bag 304 is provided inside of the cushion main body 120. The inner bag 304 is provided to surround the inflator 110 by a base cloth inside of the cushion main body 120, i.e., it is an interior bag. Because the inner bag 304 receives the gas that is supplied from the inflator 110 before such as the main panel 106a receives, it is possible to prevent the rigidity of such as the main panel 106 that contacts with the occupant from being rapidly increased.

The inner bag 304 is provided in a bag shape enclosing the inflator 110 therein. The inner bag 304 can also be provided in a manner in which, for instance, a base cloth that is fitted to the shape of the vehicle rear side of the cushion 104 is folded and arranged in the bag shape and a part thereof is overlapped and sewed together with the outer circumference of the main panels 106a and 106b (refer to FIG. 1A).

As the portions for supplying the gas to the vehicle front side of the cushion main body 104, two openings, which are an inner vent 306a at the top portion and an inner vent 306b at the bottom portion of the vehicle front side, are provided in the inner bag 304. The gas that is supplied from the inflator 110 respectively passes through the inner vents 306a and 306b and flows toward the vehicle front side. As explained above, in the present embodiment, the configuration in which the inner bag 304 receives the gas from the inflator 110 first, and subsequently, the gas is supplied to the entirety of the cushion main body 120 from the inner bag 304 is adopted.

In the present embodiment, a branching tether 310 is provided at a tether 308. As explained below, the branching tether 310 works to prevent the tether 308 after being cut from popping out from the inside of the cushion 302.

Figure 13B:
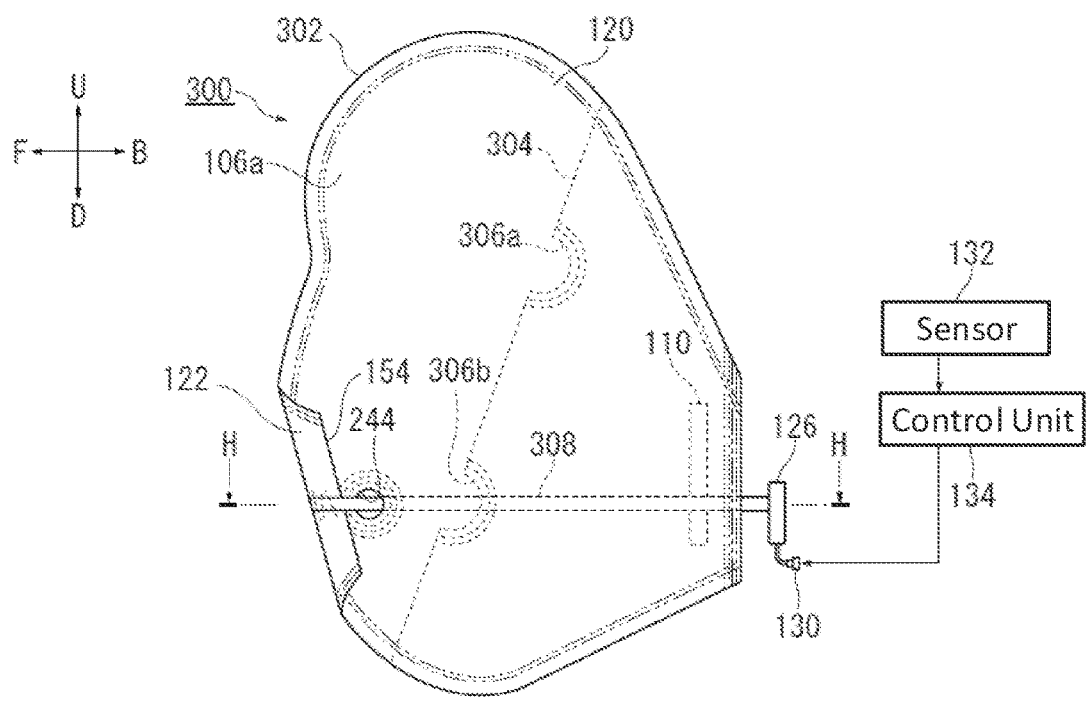

FIG. 13B is a diagram that shows a state in which the cushion protruding part 122 shown in FIG. 13A is folded back. As exemplarily shown in FIG. 13B, in the side airbag device 300, the tether 308 also enters inside of the cushion main body 120 from the vent hole 244, passes through the inside of the cushion main body 120, and bridges over the tether cutter 126.

In the present embodiment, it is possible that the tether 308 efficiently pulls and folds back the cushion protruding part 122 by bridging over the tip of the cushion protruding part 122. Further, as exemplarily shown in FIG. 13A, the cushion protruding part 122 has a tapered shape and the width in the vehicle vertical direction is tapered off toward the vehicle front side at the time of the expansion by receiving the gas. Because of the tapered shape, the gas can be smoothly flown to the tip, and further, the gas can be efficiently discharged from the protruding vent 154 at the tip.

Figure 14A:
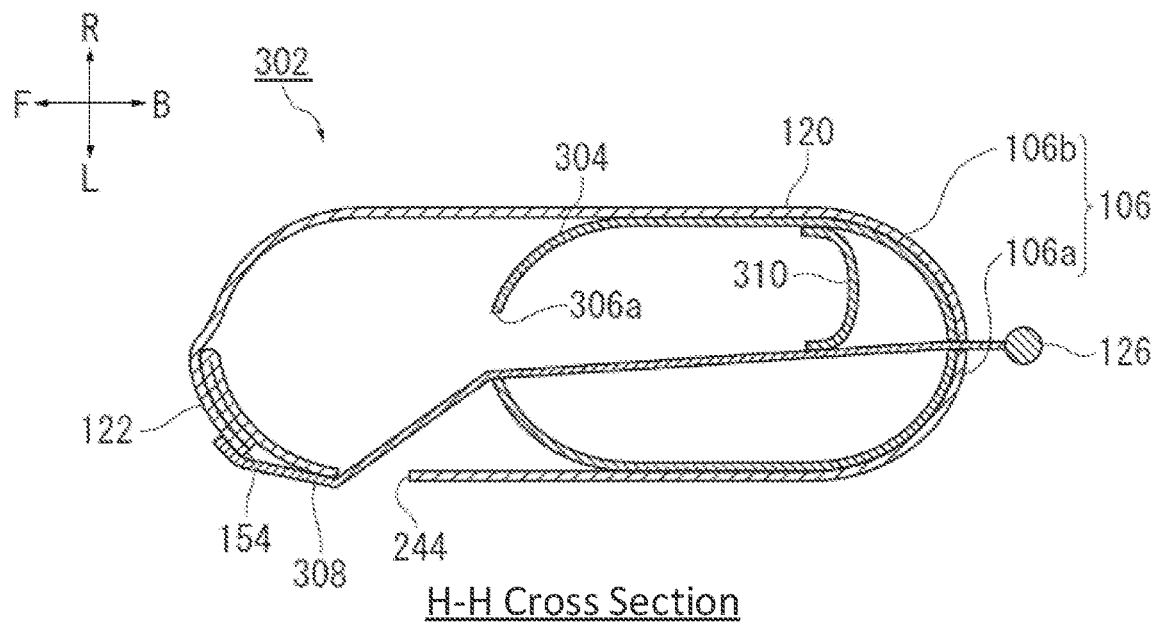
FIG. 14 is a diagram that exemplarily shows the cushion shown in FIG. 13B viewed from each of directions.

FIG. 14 is a diagram that exemplarily shows the cushion 302 shown in FIG. 13B viewed from each of directions. FIG. 14A is a cross sectional view along the H-H line of the cushion 302 shown in FIG. 13B. FIG. 14A shows a state of the cushion 302 after the movement of the inflator 110 and exemplarily shows a state in which the tether cutter 126 is not moved yet. The branching tether 310 bridges over between the inside of the inner bag 304 and the tether 308 in the cushion main body 120.

Figure 14B:
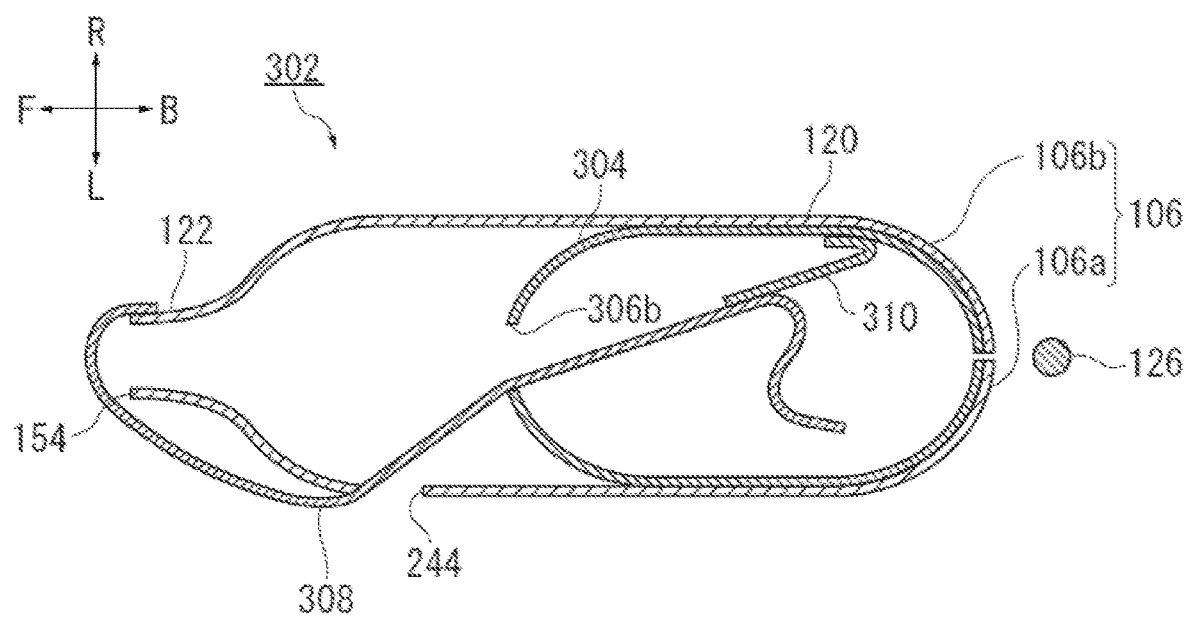

FIG. 14B exemplarily shows a state of the cushion 302 after the movement of the tether cutter 126 shown in FIG. 14A. The branching tether 310 holds the tether 308 after being cut inside of the cushion main body 120 and prevents the tether 308 from popping out from the cushion main body 120 through the vent hole 244 or the protruding vent 154. As a result, it is possible to prevent the unexpected situation in which the tether 308 twines around the protruding vent 154 or the external structures so as to maintain the performance of the cushion 302. In this case, it is preferred that a length of the branching tether 310 is set to be an approximate length that allows the cushion protruding part 122 can be expanded and deployed by deviating from the folded-back.

Figure 15A:
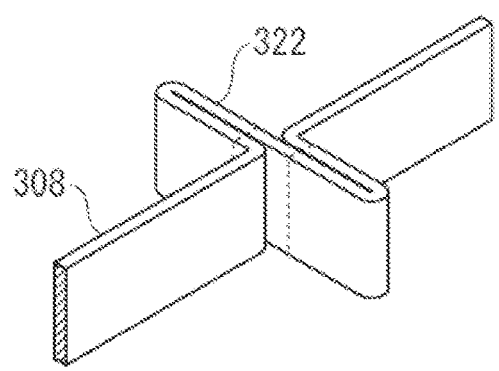
FIG. 15 is a diagram that exemplarily shows a side airbag device according to a ninth embodiment of the present invention.
Figure 15B:
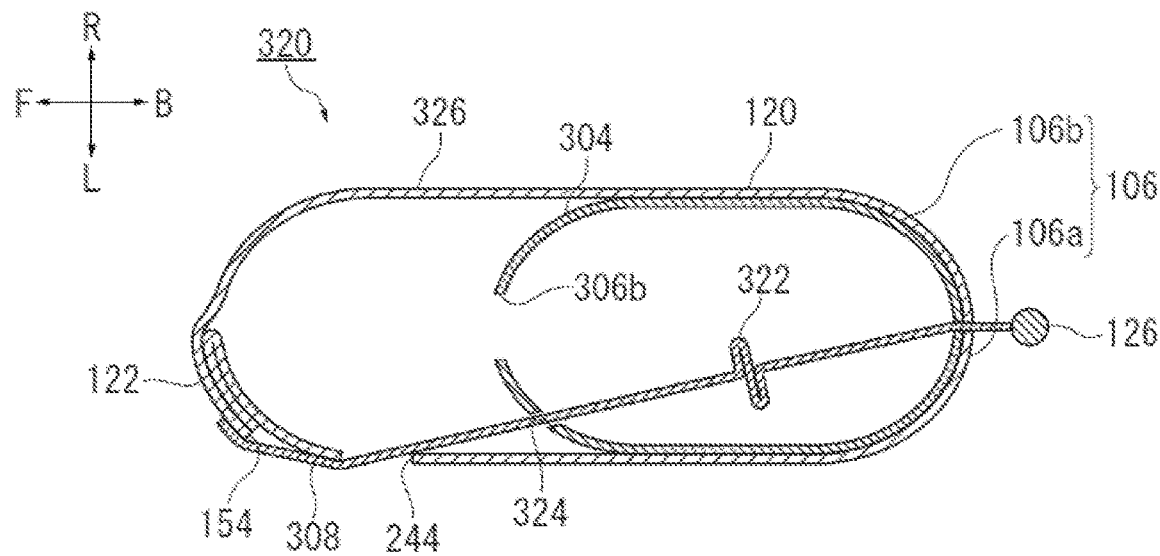

FIG. 15 is a diagram that exemplarily shows a side airbag device 320 according to a ninth embodiment of the present invention. As shown in FIG. 15B explained below, the side airbag device 320 has a folded part 322 as an interference member at an intermediate portion of the tether 308. In the same manner as the branching tether 310 shown in FIG. 14A, the folded part 322 also prevents the tether 308 after being cut from popping out from the cushion main body 120.

FIG. 15A is an enlarged perspective view of the folded part 322. The folded part 322 is provided by folding a part of the tether 308 back several times and performing the sewing so as to project toward a direction crossing the tether 308 when the tether 308 is linearly extended.

FIG. 15B shows a state of a cushion 326 after the movement of the inflator 110 and exemplarily shows a state in which the tether cutter 126 is not moved yet. The folded part 322 is provided in the tether 308 inside of the cushion main body 120, and further inside the inner bag 304. The tether 308 bridges over the tether cutter 126 through a slit 324 that is provided at the inner bag 304, however, the tether 324 can also bridge over to the tether cutter 126 through the inner vent 306b.

Figure 15C:
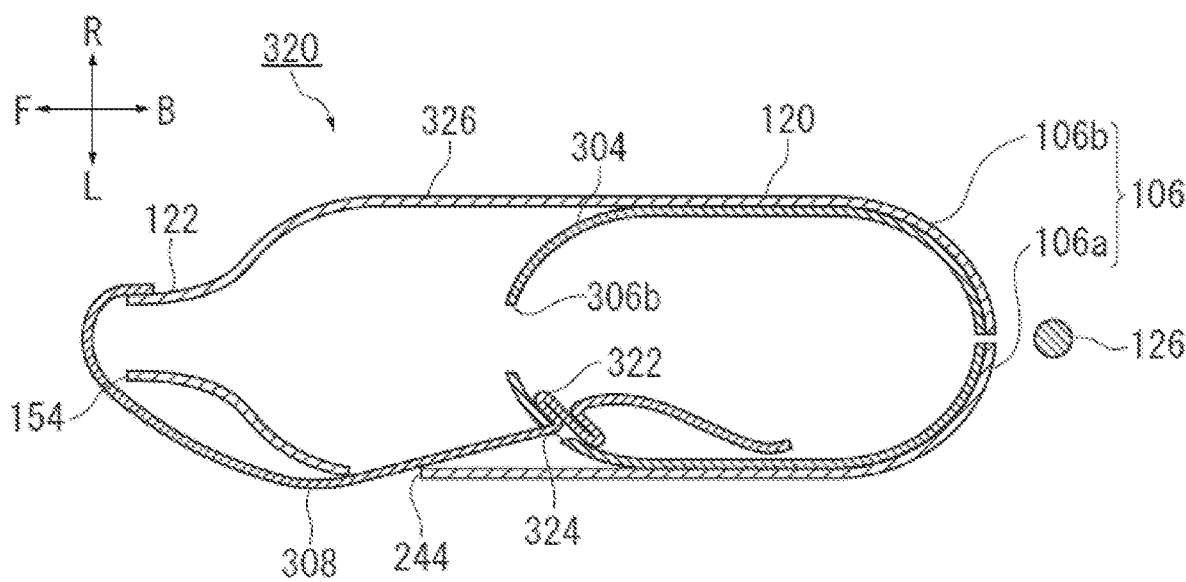

FIG. 15C is a diagram that exemplarily shows a state of the cushion 326 after the movement of the tether cutter 126 shown in FIG. 15B. After the tether 308 is cut and the cushion protruding part 122 is expanded and deployed, and further, when the tether 308 moves in a pulling-out direction from the vent hole 244, the folded part 322 interferes with the edge of the slit 324 of the inner bag 304 inside of the cushion main body 120. As a result, the tether 308 after being cut can be prevented from popping out from the cushion main body 120. Therefore, it is possible to prevent the unexpected situation in which the tether 308 twines around the other structures so as to maintain the performance of the cushion 302.

Further, it is also possible that the folded part 322 has a configuration in which the tether 308 passes through the inner vent 306b and the folded part 322 interferes with the edge of the inner vent 306b.

FIG. 16 is a diagram that exemplarily shows a side airbag device 340 according to a tenth embodiment of the present invention. In the present embodiment, a patch 342 is provided as the interference member that has the same function as the folded part 322 shown in FIG. 15B at the intermediate portion of the tether 308.

Figure 16A:
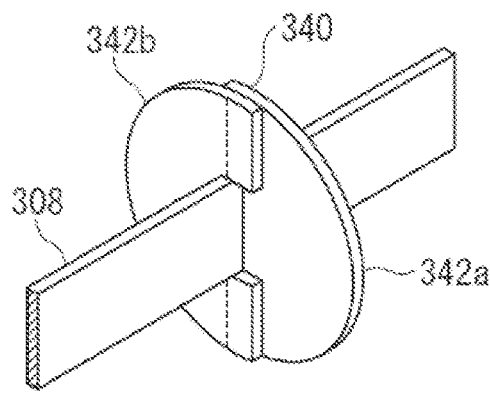
FIG. 16 is a diagram that exemplarily shows a side airbag device according to a tenth embodiment of the present invention.

FIG. 16A is an enlarged perspective view of the patch 342. The patch 342 is a circular part that is attached to the tether 308 and projects toward a direction crossing the tether 308 when the tether 308 is linearly extended.

Figure 16B:
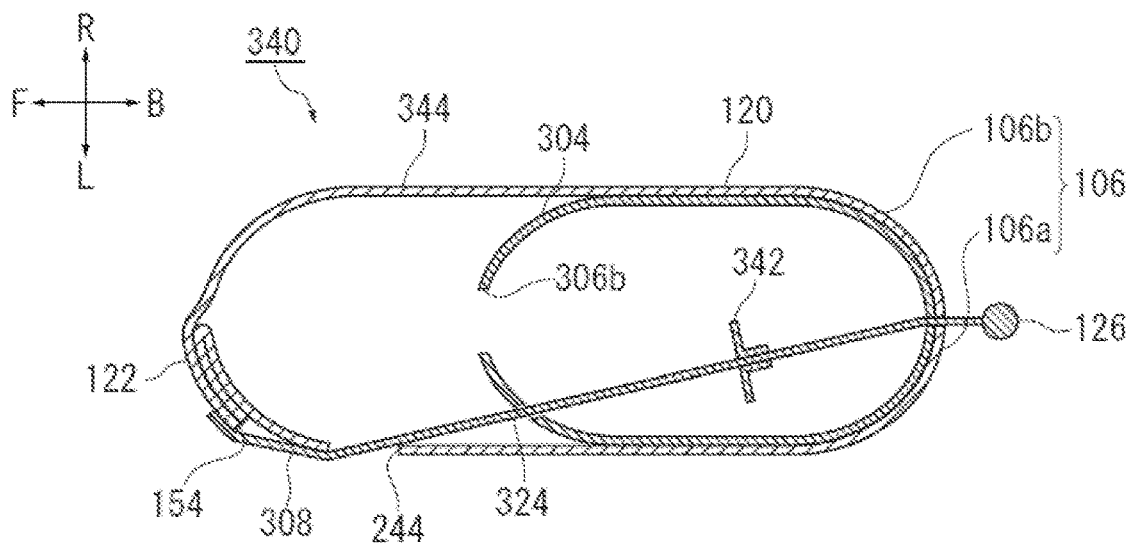

FIG. 16B shows a state of a cushion 344 after the movement of the inflator 110 and exemplarily shows a state in which the tether cutter 126 is not moved yet. The patch 342 is provided on the tether 308 inside of the cushion main body 120, and further inside the inner bag 304.

Figure 16C:
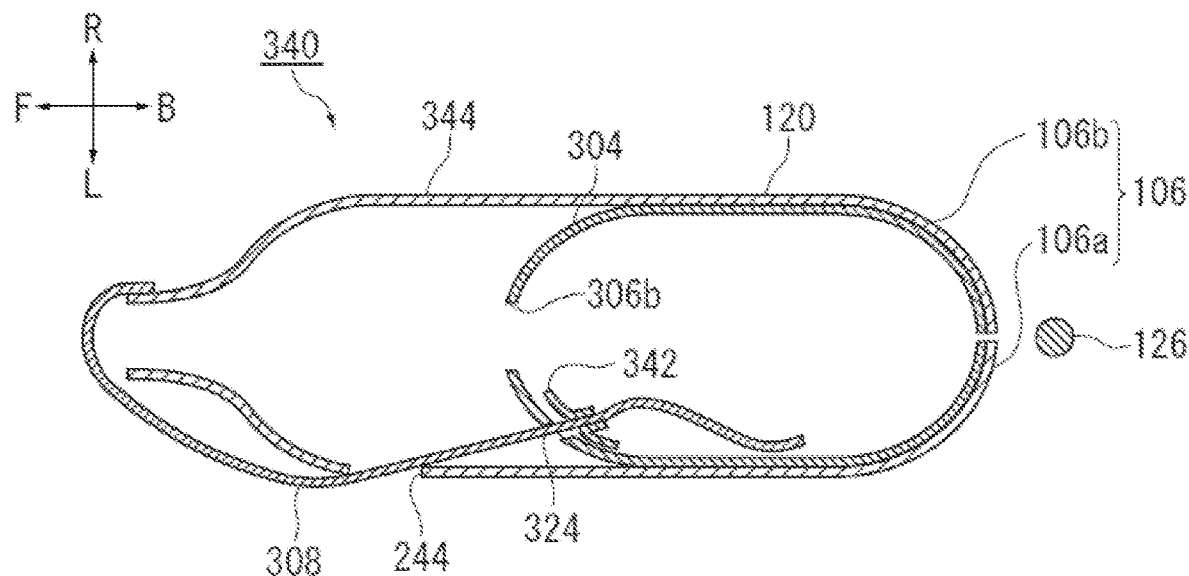

FIG. 16C is a diagram that exemplarily shows a state of the cushion 344 after the movement of the tether cutter 126 shown in FIG. 16B. After the tether 308 is cut and the cushion protruding part 122 is expanded and deployed, and further, when the tether 308 moves in a pulling-out direction from the vent hole 244, the patch 342 interferes with the edge of the slit 324 of the inner bag 304 inside of the cushion main body 120. As a result, the tether 308 after being cut can be prevented from popping out from the cushion main body 120. Therefore, it is possible to prevent the unexpected situation in which the tether 308 twines around the other structures so as to maintain the performance of the cushion 344.

Further, it is also possible that the patch 342 has a configuration in which the tether 308 passes through the inner vent 306b and the patch 342 interferes with the edge of the inner vent 306b.

Figure 17A:
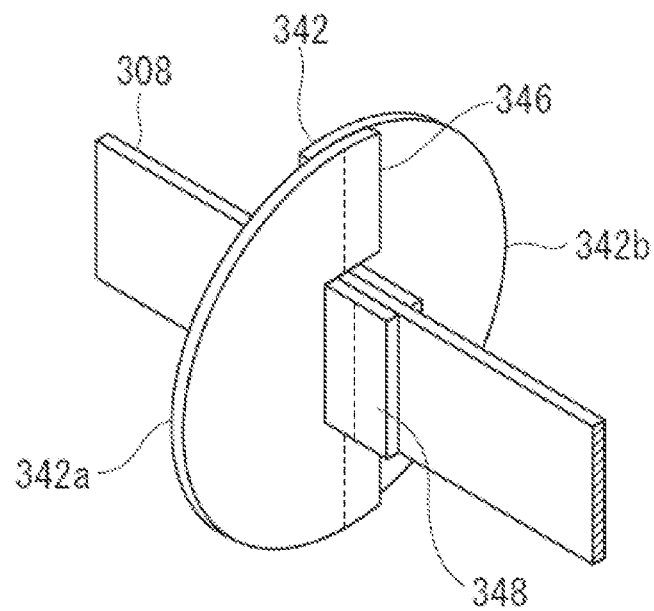
FIG. 17 is a diagram that exemplarily shows a patch shown in FIG. 16A viewed from each of directions.

FIG. 17 is a diagram that exemplarily shows the patch 342 shown in FIG. 16A viewed from each of directions. FIG. 17A exemplarily shows the patch 342 shown in FIG. 16A as seen from the opposite side. The patch 342 can be made by the same material as the tether 308 and the main panel 106 (refer to FIG. 1A) and is attached to the tether 308 by sewing two independent first component 342a and second component 342b each other.

Figure 17B:
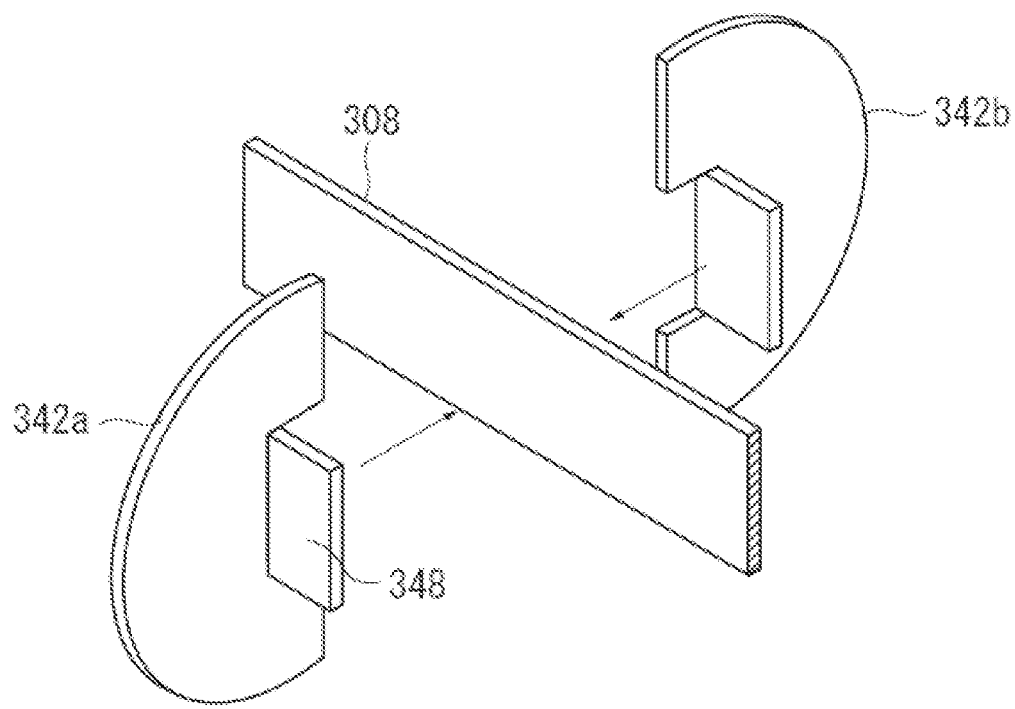

FIG. 17B is an exploded view that shows the patch 342 shown in FIG. 17A. The first component 342a and the second component 342b are respectively formed into semi-circular shapes and have a configuration in which a projecting piece 348 projects from a linear edge 346. As exemplarily shown in FIG. 17A, the first component 342a and the second component 342b are sewed together at the edge 346 and are sewed to the tether 308 via the projecting pieces 348. According to these configurations, the patch 342 that can interfere with the inside of the cushion main body 120 can be suitably realized.

Figure 18A:
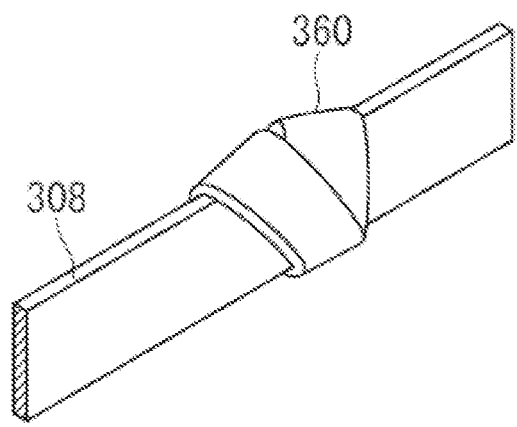
FIG. 18 is a diagram that exemplarily shows variations of an interference member shown in FIGS. 15 and 17.

FIG. 18 is a diagram that exemplarily shows variations of the interference member shown in FIGS. 15 and 17. A knot part 360 shown in FIG. 18A is provided by providing a knot at a predetermined position of the tether 308 as a variation of the folded part 322 shown in FIG. 15A. By providing the knot part 360, the position, which projects in a direction crossing the tether 308 when the tether 308 is linearly extended, can also be realized. Therefore, the knot part 360 also interferes with the slit 324 in the same manner as the folded part 322 shown in FIG. 15C so as to prevent the tether 308 from popping out from the cushion main body.

Figure 18B:
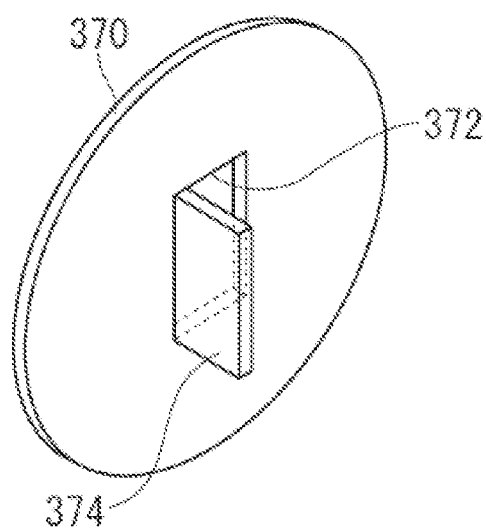

FIG. 18B is a diagram that exemplarily shows a variation of the patch 342 shown in FIG. 17B. A patch 370 shown in FIG. 18B is a single individual circular component and has a hole 372 in a center, and a projecting piece 374 is provided at the edge of the hole 372. Because the tether 308 (refer to FIG. 17B) passes through the hole 372 and the projecting piece 374 is sewed to the tether 308, the patch 370 also becomes the interference member that interferes with the slit 324 of the inner bag 304 (refer to FIG. 16C). Therefore, the patch 370 can also suitably prevent the tether 308 from popping out from the cushion main body 120.

FIG. 19 is a diagram that exemplarily shows a side airbag device 400 according to an eleventh embodiment of the present invention. In the present embodiment, a reinforcement 402 is provided to reinforce the cushion protruding part 122.

Figure 19A:
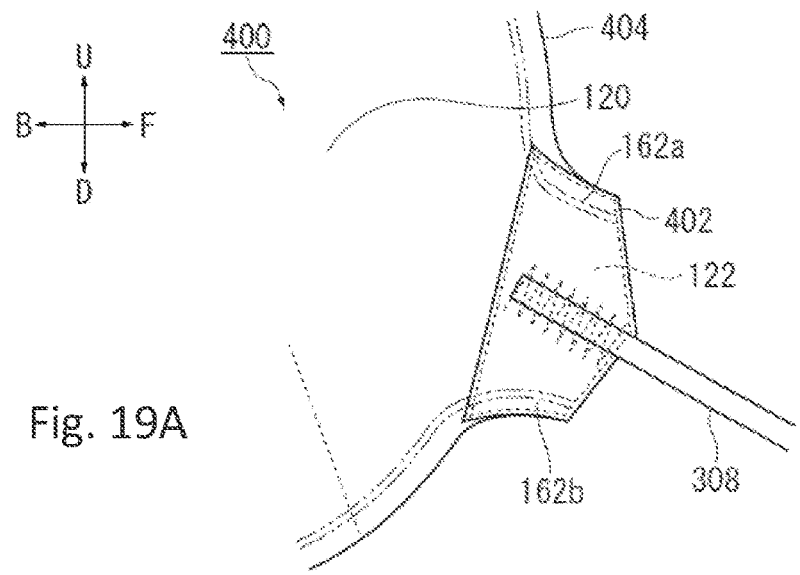
FIG. 19 is a diagram that exemplarily shows a side airbag device according to an eleventh embodiment of the present invention.

FIG. 19A exemplarily shows the cushion protruding part 122 as seen from the right side in the vehicle width direction. The reinforcement 402 is formed into a shape corresponding to the cushion protruding part 122 and a tip side of the reinforcement 402 projects as a triangle at a tip side of the cushion protruding part 122. The reinforcement 402 can be composed by the same material as the base cloth that composes a cushion 404.

The reinforcement 402 is sewed to the cushion protruding part 122 along the outer circumference. Further, the reinforcement 402 is sewed together with the cushion protruding part 122 via the outer peripheral sewing parts 162a and 162b that sew the outer circumference of the cushion protruding part 122 in the vehicle width direction. According to these configurations, the reinforcement 402 can be sewed to the cushion protruding part 122 in a concise manner. The tether 308 is sewed to the cushion protruding part 122 together with the reinforcement 402 over the reinforcement 402.

Figure 19B:
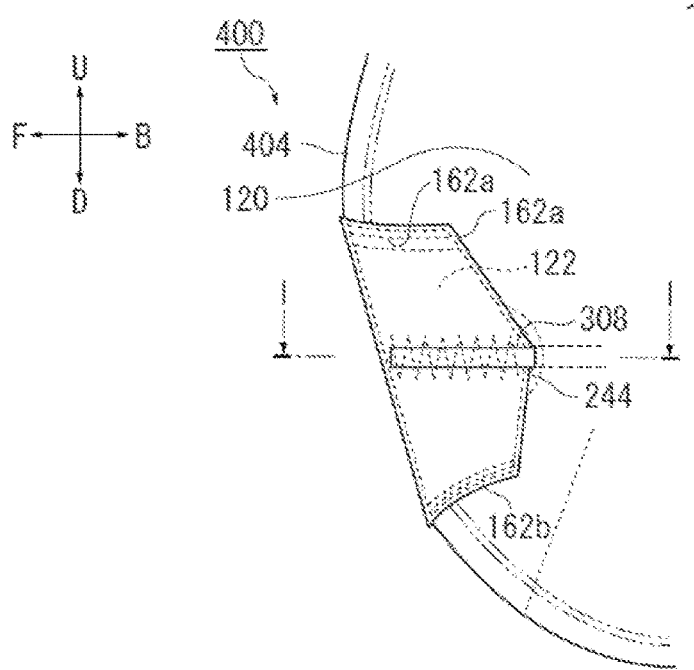

FIG. 19B is a diagram that exemplarily shows a state in which the cushion protruding part 122 shown in FIG. 19A is folded back. As exemplarily shown in FIG. 19B, the tether 308 enters inside of the cushion main body 120 from the vent hole 244, passes through the inside of the cushion main body 120, and bridges over the tether cutter 126.

Figure 19C:
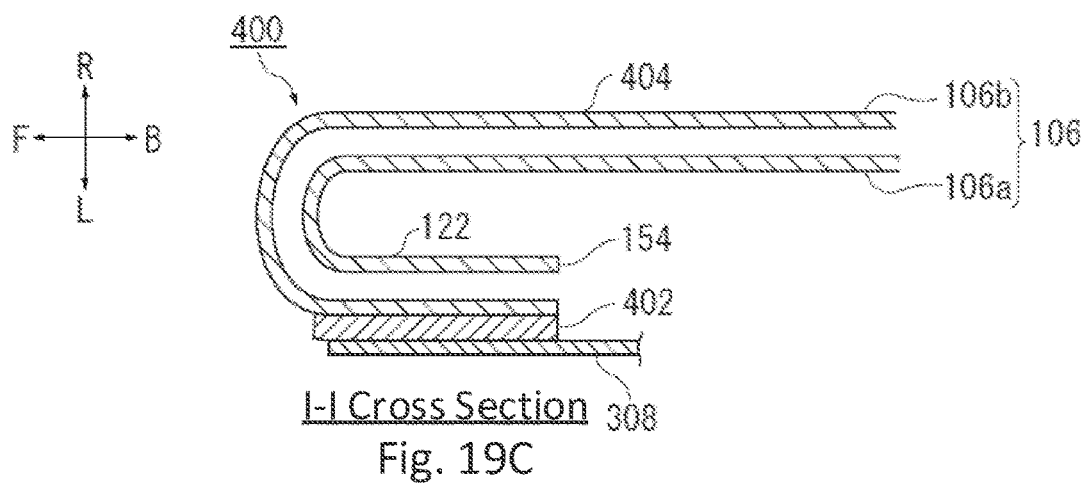

FIG. 19C is a cross sectional view along the I-I line of the cushion 404 shown in FIG. 19B. The reinforcement 402 is provided at the outside of the folded cushion protruding part 122. Further, the term "outside" of the folded cushion protruding part 122 denotes an exposed side that does not face the cushion main body 120 and the term "inside" denotes an unexposed side that faces the cushion main body 120. The reinforcement 402 is composed to be thicker than the base cloth of the cushion protruding part 122. Therefore, the reinforcement 402 has higher rigidity as compared with the base cloth of the cushion protruding part 122. By attaching the reinforcement 402, with respect to the cushion protruding part 122, the rigidity is improved so that the durability against the gas pressure and the heat is improved.

The tip side of the reinforcement 402 is formed in a triangle shape and the tether 308 is attached in a state in which the tether 308 passes in the vicinity of an apex of the reinforcement 402. Therefore, power being transmitted from the tether 308 is efficiently dispersed into the entirety of the reinforcement 402 so that the damage of the cushion protruding part 122 can also be efficiently prevented.

FIG. 20 is a diagram that exemplarily shows a side airbag device 420 according to a twelfth embodiment of the present invention. In the present embodiment, a reinforcement 422 is also provided in order to reinforce the cushion protruding part 122.

Figure 20A:
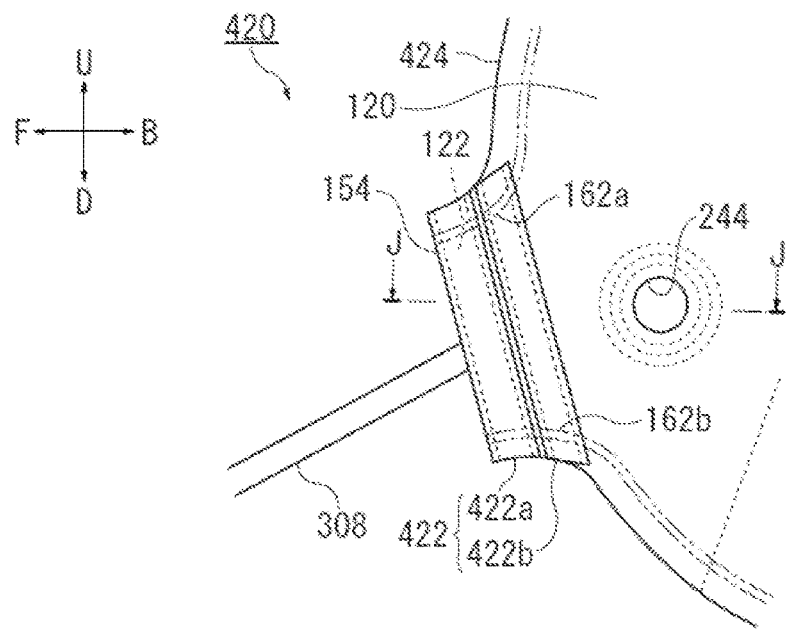
FIG. 20 is a diagram that exemplarily shows a side airbag device according to a twelfth embodiment of the present invention.

FIG. 20A exemplarily shows the cushion protruding part 122 as seen from the left side in the vehicle width direction. The reinforcement 422 is formed into a shape corresponding to the cushion protruding part 122 and is provided to be divided into a plurality of components in a direction from the cushion main body 120 toward the tip of the cushion protruding part 122. In the present embodiment, the reinforcement 422 is divided into two components, a first component 422a and a second component 422b.

Figure 20B:
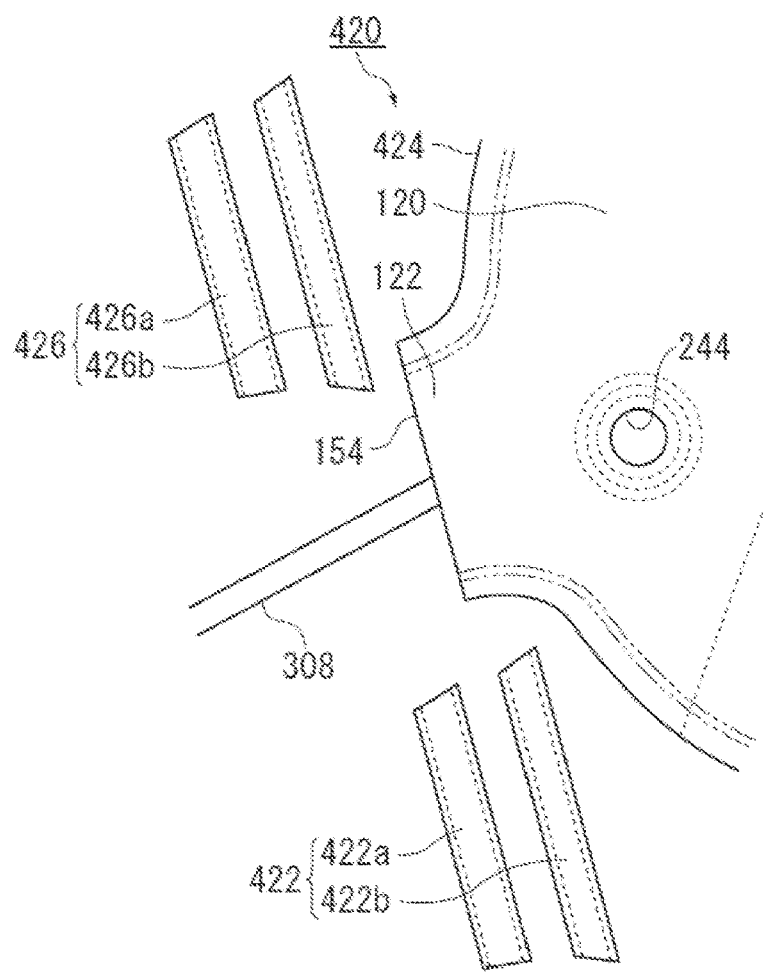

FIG. 20B is an exploded view of such as the reinforcement 422 shown in FIG. 20A. In the present embodiment, the reinforcement 422 and another reinforcement 426 are attached from both sides in the vehicle width direction of the cushion protruding part 122, respectively. The reinforcement 426 is also attached by being divided into two components, a first component 426a and a second component 426b in total.

Figure 21A:
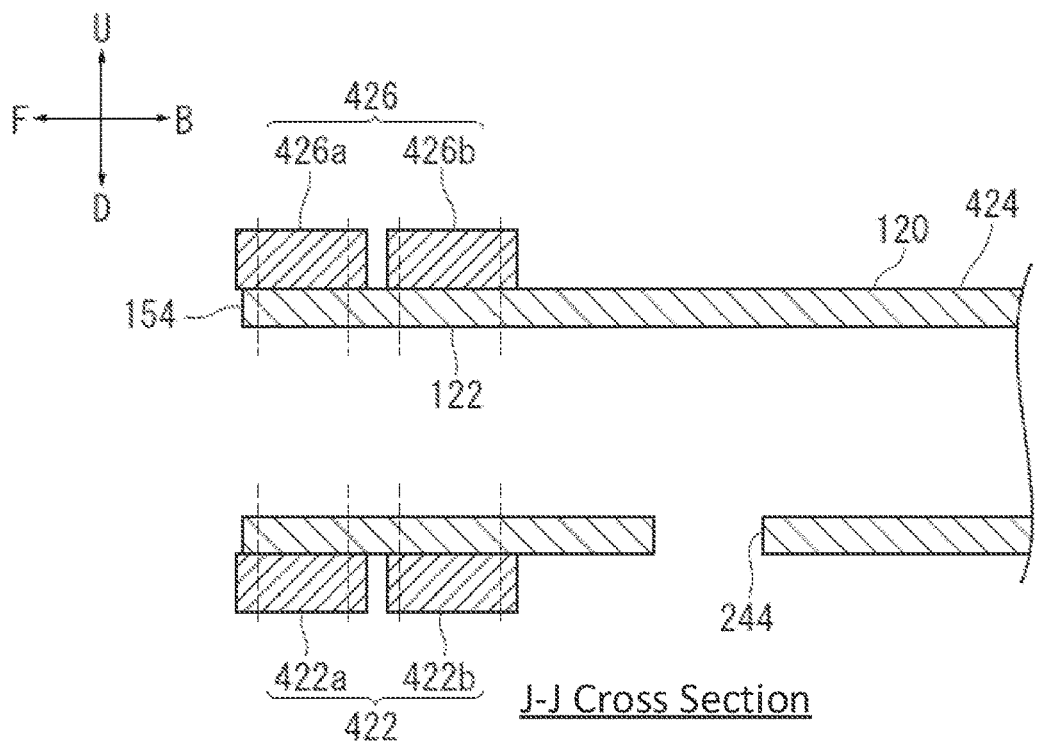
FIG. 21 is a diagram that exemplarily shows a cushion shown in FIG. 20A viewed from each of directions.

FIG. 21 is a diagram that exemplarily shows the cushion 424 shown in FIG. 20A viewed from each of directions. FIG. 21A is a cross sectional view along the J-J line of the cushion protruding part shown in FIG. 20A. The reinforcements 422 and 426 are composed to be thicker than the base cloth of the cushion protruding part 122 and hold parts of the cushion protruding part 122 and the cushion main body 120 from both sides in the vehicle width direction. According to the reinforcements 422 and 426, the tolerance to the gas pressure and the heat of the cushion protruding part 122 can be improved and the cushion protruding part 122 can be suitably reinforced.

Figure 21B:
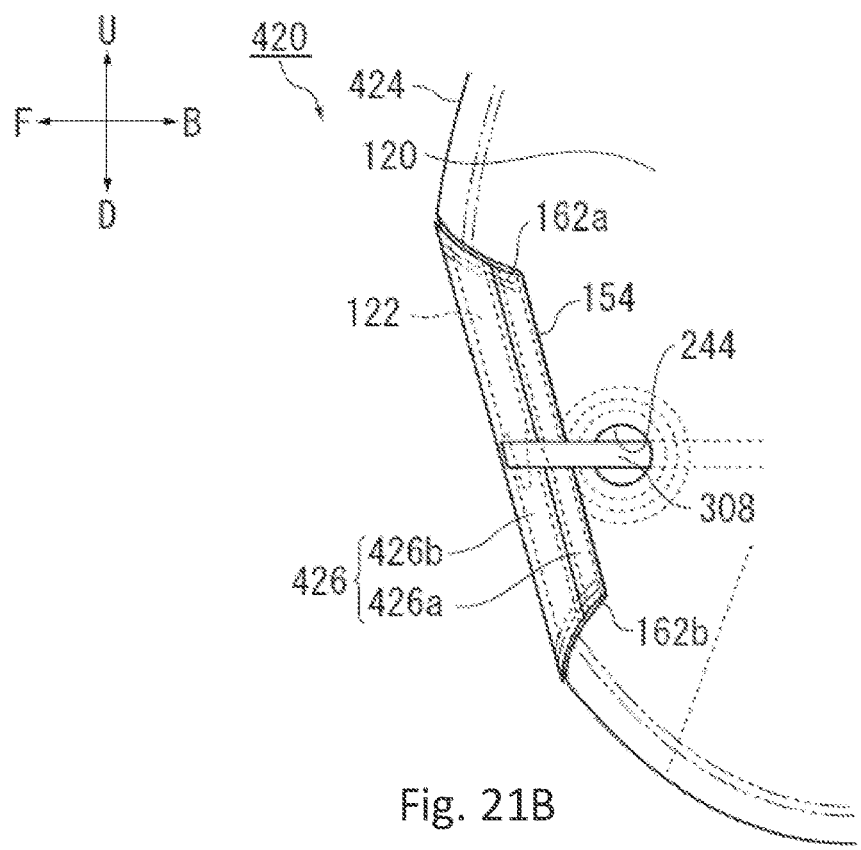

FIG. 21B is a diagram that exemplarily shows a state in which the cushion protruding part 122 shown in FIG. 20A is folded back. Even the cushion protruding part 122 to which the reinforcements 422 and 426 are attached, it is possible to be suitably folded back because an interval between each of the components that composes the reinforcements 422 and 426 becomes a joint. For instance, the reinforcements 422 and 426 can also be divided by a line segment that crosses the tether 308 in a state in which the tether 308 bridges over the tether cutter 126 (refer to FIG. 13B).

FIG. 22 is a diagram that exemplarily shows a side airbag device 440 according to a twelfth embodiment of the present invention. In the present embodiment, a reinforcement 442 is also provided in order to reinforce the cushion protruding part 122 of a cushion 448.

Figure 22A:
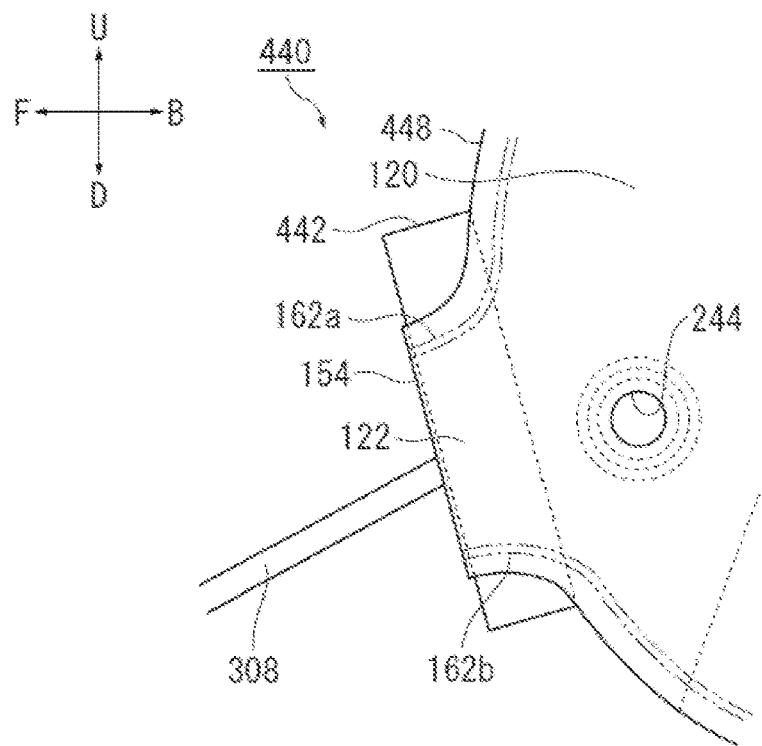
FIG. 22 is a diagram that exemplarily shows a side airbag device according to a twelfth embodiment of the present invention.

FIG. 22A exemplarily shows the cushion protruding part 122 as seen from the left side in the vehicle width direction. The reinforcement 442 is formed into a rectangular shape and is attached so as to cover parts of the cushion protruding part 122 and the cushion main body 120. The reinforcement 442 can also be sewed together with the cushion protruding part 122 via the outer peripheral sewing parts 162a and 162b of the cushion protruding part 122.

Figure 22B:
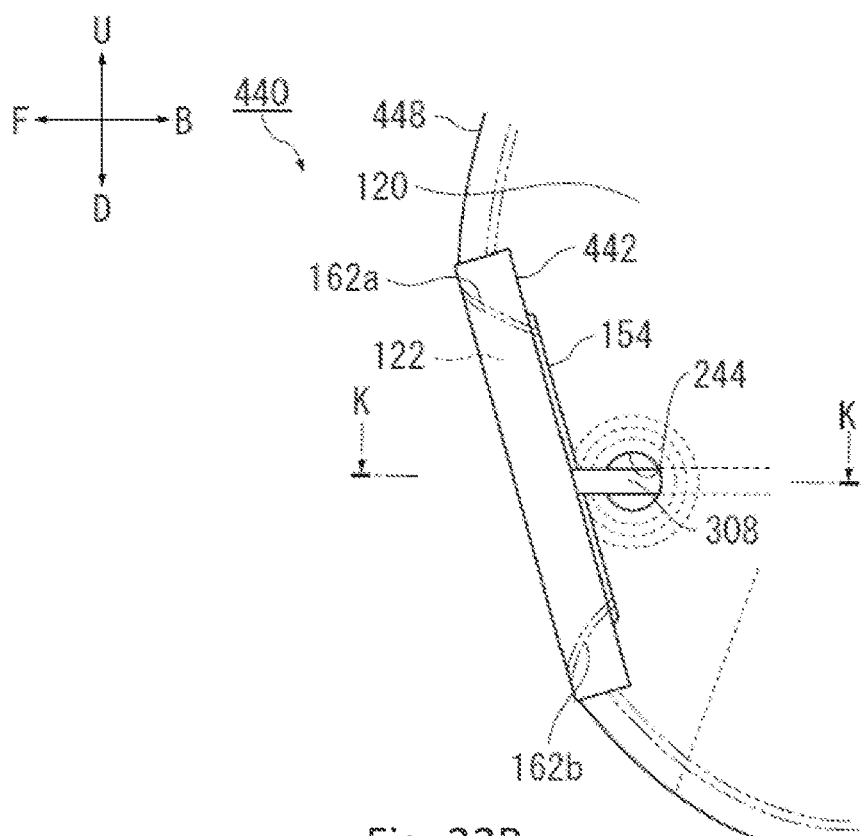

FIG. 22B is a diagram that exemplarily shows a state in which the cushion protruding part 122 shown in FIG. 22A is folded back. As explained below, the reinforcement 442 can be cured to some degree by applying a heating and pressuring processing and can hold the shape of the cushion protruding part 122 being folded by maintaining the shape of the reinforcement 442.

Figure 23A:
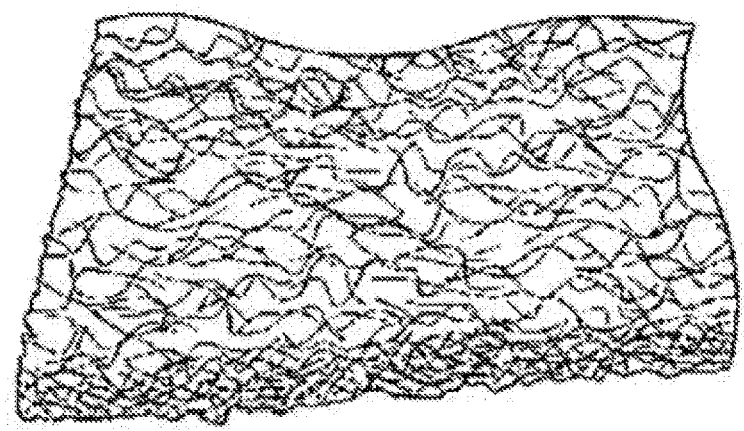
FIG. 23 is a diagram that exemplarily shows a reinforcement shown in FIG. 22A viewed from each of directions.

FIG. 23 is a diagram that exemplarily shows the reinforcement 442 shown in FIG. 22A viewed from each of directions. FIG. 23A is an enlarged perspective view of the reinforcement 442. The reinforcement 442 according to the present embodiment is provided as a ductile fabric material that contains a plurality of different polymeric fibers.

Figure 23B:
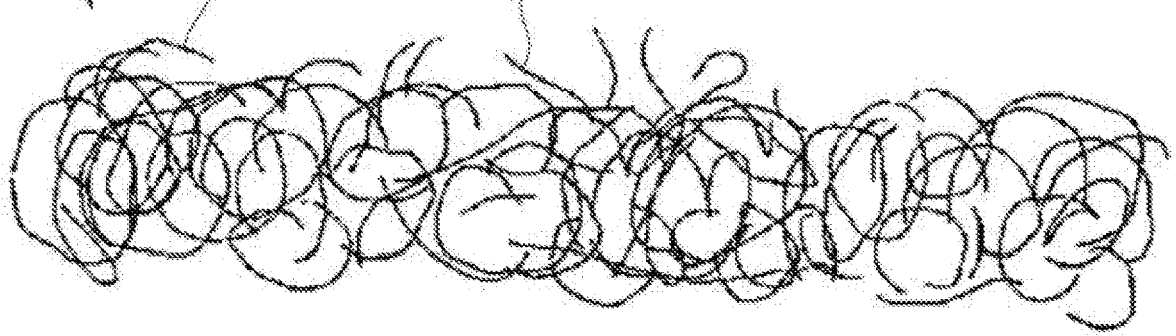

FIG. 23B is a diagram that exemplarily shows a cross section of the reinforcement 442 shown in FIG. 23A. The reinforcement 442 has a state of a nonwoven fabric in which the polymeric fibers are intertwined without being weaved. A two-component conjugate fiber 444 in a sheath-core structure and a single component fiber 446 that is composed by a single component are included in the plurality of different polymeric fibers that composes the reinforcement 442.

The two-component conjugate fiber 444 is composed of a bilayer configuration of a core part on the center side and a sheath part that covers the circumference of the core part. These core part and the sheath part are composed of the polymeric materials that has different components, respectively. In the present embodiment in particular, as compared with a first polymeric material that composes the core part, a second polymeric material that composes the sheath part adopts the fiber that has a lower melting point.

For instance, the two-component conjugate fiber 444 can be adopted as a polyester fiber that is composed of polyethylene terephthalate (PET). For instance, the first polymeric material of the core part can be a PET homopolymer and the second polymeric material of the sheath part can be a PET copolymer. Because a copolymerization component is added to the PET copolymer, the melting point is lower as compared with the PET homopolymer (for instance, a range of 120 to 150° C.). According to these configurations, the two-component conjugate fiber 444 can be suitably adopted.

It is preferable to adopt a fiber for the single component fiber 446. Such fiber has the higher melting point than the surface of the two-component conjugate fiber 444 that is the other polymeric fiber. For instance, as the single component fiber 446, the polyester fiber that is formed only by the PET homopolymer can be adopted. It is preferable to adopt such single component fiber 446 that has the higher melting point than the sheath part (PET copolymer) of the surface of the two-component conjugate fiber.

The reinforcement 442 can be adopted as the nonwoven fabric (polyester felt) that is made of 100 percent PET by an well-known needle method in which the two-component conjugate fiber 444 and the single component fiber 446 as the materials are fixed by being twined each other at random or pseudo-random by a needle processing. In this case, the two-component conjugate fiber 444 accounts for 30%-60% of an entire fiber and all of residuals can be the single component fiber 446.

Figure 23C:
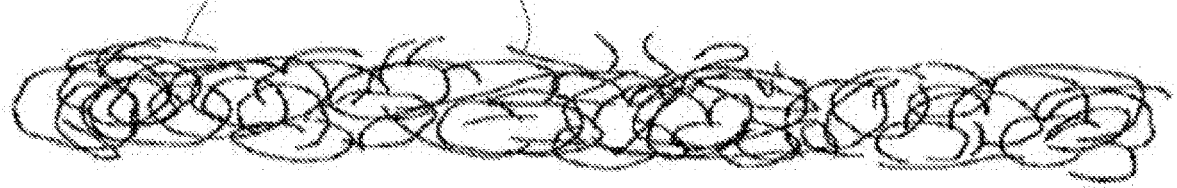

FIG. 23C is a diagram that exemplarily shows a state in which a heating and pressuring processing to the reinforcement 442 shown in FIG. 23B is performed. With respect to the reinforcement 442 that has the configuration explained above, by performing the heating and pressuring by pressing with a predetermined apparatus, the sheath part of the surface of the two-component conjugate fiber 444 is melt and at least the parts of the two-component conjugate fiber 444 and the single component fiber 446 are adhered each other. According to this processing, a thickness of the reinforcement becomes thinner (for instant, being compressed approximately 4.25 mm to approximately 0.55 mm) as compared to a state in which such processing is not performed yet, and as a result, the reinforcement is moderately cured and the shape thereof is maintained.

Figure 24A:
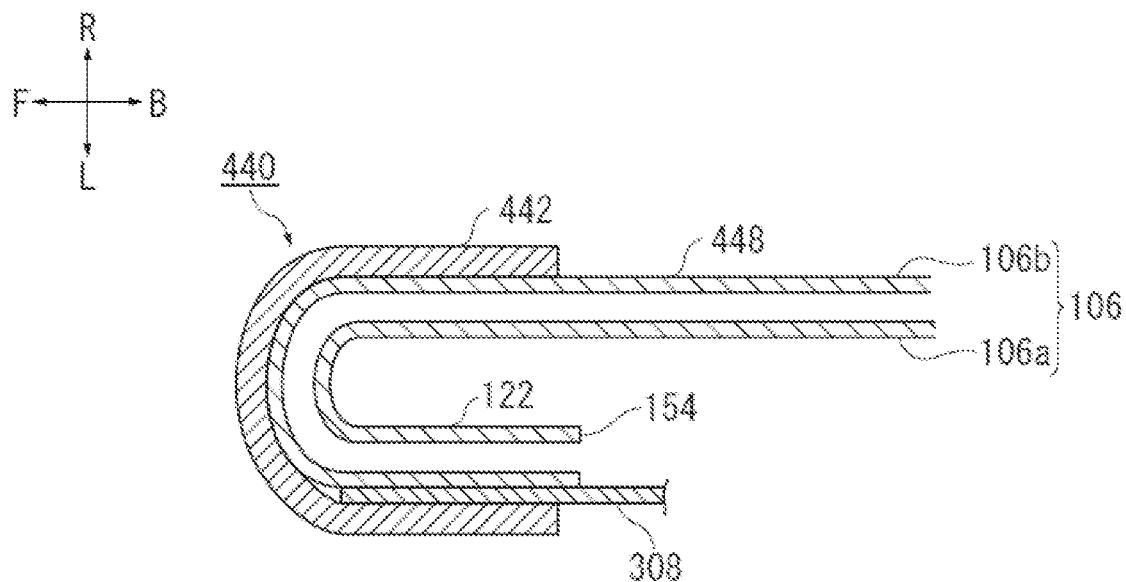
FIG. 24 is a cross sectional viewed along the K-K line of a reinforcement shown in FIG. 22B.

FIG. 24 is a cross sectional view along the K-K line of the reinforcement shown in FIG. 22B. The reinforcement 442 shown in FIG. 24A exemplarily shows a state before the heating and pressuring processing to the reinforcement is performed. The cushion protruding part 122 is folded to the side surface at the exterior side (the middle and bottom sides in FIG. 24A) in the vehicle width direction of the cushion main body 120. The reinforcement 442 is provided to cover the cushion protruding part 122 from the outside of the folded cushion protruding part 122, i.e., from a mountain fold side relative to a folded part.

Figure 24B:
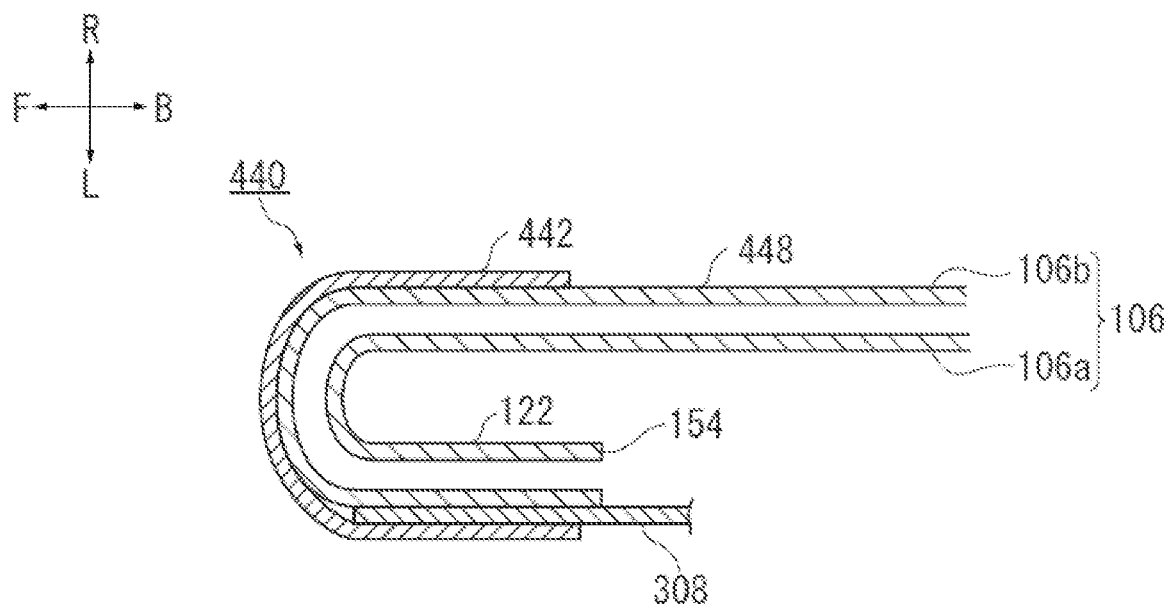

FIG. 24B is a diagram that exemplarily shows a state in which the heating and pressuring processing to the reinforcement 442 shown in FIG. 24A is performed. For instance, the heating and pressuring processing is performed at a temperature that is above the melting point of the sheath part of the two-component conjugate fiber 444 (refer to FIG. 23A), and at the same time, that is lower than the melting points of the single component fiber 446 and the core part of the two-component conjugate fiber 444. As a result, the sheath part of the two-component conjugate fiber 444 and only the part of the single component fiber 446 are adhered, and the core part of the two-component conjugate fiber 444 and the single component fiber 446 are not adhered each other so that they are in the solid phases. Further, it is not required that the heating and the pressuring are performed at the same time.

As shown FIG. 24B, the reinforcement 442 has a thinner thickness and becomes hard by the heating and pressuring processing so that the shape thereof is maintained. This reinforcement 442 can hold the state of the cushion protruding part 122 being folded back without relying on the tether 308. That is, the folded-back part of the cushion protruding part 442 can be temporarily fixed. Therefore, the reinforcement 442 can significantly improve the efficiency such as for the work of mounting the cushion 448 to the seat 102 (refer to FIG. 1A).

Because the reinforcement 442 is not entirely cured even though being cured to a certain extent, when the tether 308 is cut in the emergency, the cushion protruding part 122 can be released without any problems. Further, the reinforcement 442 also has the function in which the durability against the gas pressure and the heat and the tension that is added by the tether 308 for the cushion protruding part 122 is improved in the same manner as the reinforcement 402 shown in FIG. 19A, and the cushion protruding part 122 can be suitably reinforced.

The heating and pressuring processing can also be applied to only part of the reinforcement 442. For instance, the part of the reinforcement 442 that is not overlapped with the protruding vent 154 can also have a configuration in which the heating and pressuring processing is not performed so as to remain soft. Further, the heating and pressuring processing can also be performed in stages. For instance, first, the heating and pressuring processing is performed to only part of the reinforcement 442 so that the reinforcement 442 is temporarily fixed by fusing to the base cloth of the cushion protruding part 122. Then, after the reinforcement 442 is sewed to the cushion protruding part 122 via such as the outer peripheral sewing parts 162a and 162b, the further heating and pressuring processing is performed in a state in which the cushion protruding part 122 is folded back so that the shape of the reinforcement 442 is maintained. As explained above, because the heating and pressuring processing is performed in stages, the working efficiency can be increased in the process of providing the side airbag device 440.

Figure 25:
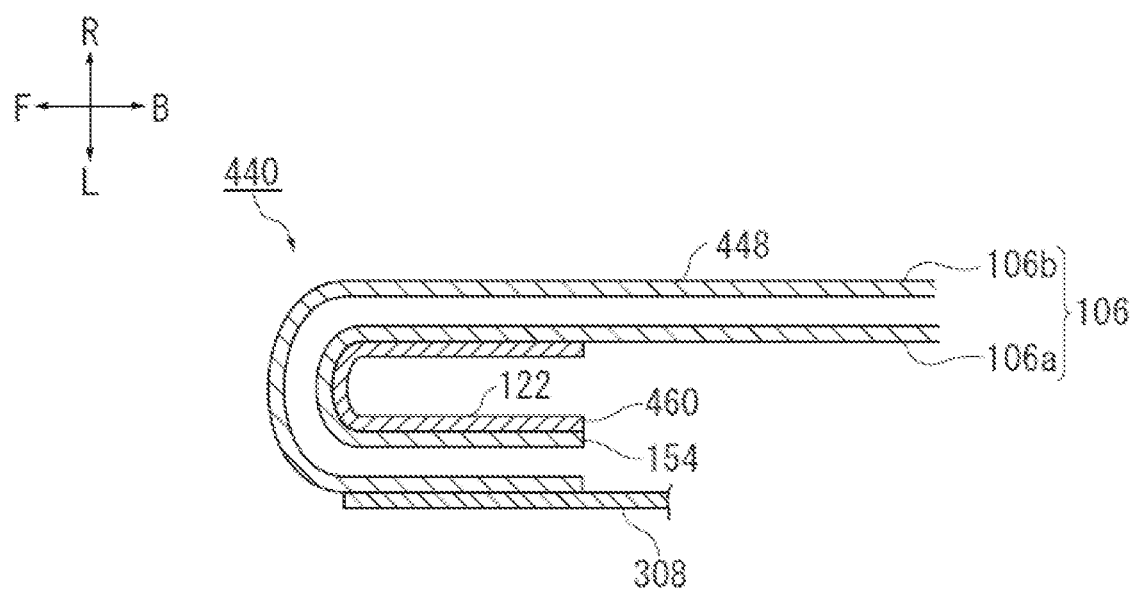
FIG. 25 is a diagram that exemplarily shows a variation of a reinforcement shown in FIG. 24B.

FIG. 25 is a diagram that exemplarily shows a variation of the reinforcement 442 shown in FIG. 24B. As shown in FIG. 25, a reinforcement 460 can also be provided at the inside of the folded cushion protruding part 122, i.e., on a mountain fold side relative to a folded part of the cushion protruding part 122. According to the reinforcement 460 having the configuration explained above, it is possible that maintaining the folded-back of the cushion protruding part 122 and reinforcing the cushion protruding part 122 are suitably performed in the same manner as the reinforcement 460 shown in FIG. 24B.

As yet another configuration, it is possible that the reinforcement 460 shown in FIG. 25 and the reinforcement 442 shown in FIG. 24B are provided at the same time and the cushion protruding part 122 is held by the reinforcements 442 and 460 from both sides in the vehicle width direction.

Further, the reinforcement 442 is formed into a rectangular shape in the configuration shown in FIG. 24A, however, the shape of the reinforcement 442 is not particularly limited. For instance, it is possible that the reinforcement 442 is provided as a larger shape and covers the entirety of the cushion protruding part 122 that is folded back. Further, it is possible that the reinforcement 442 has the shape corresponding to the cushion protruding part 122 and the excessive portion is not provided.

The reinforcement 442 can also have a configuration in which the reinforcement 442 can be partially broken. For instance, the reinforcement 442 covers the folded-back cushion protruding part 122, and at the same time, part of the reinforcement 442 is adhered to the cushion main body 120, and as a result, the reinforcement 442 holds the folded-back part of the cushion protruding part 122. Further, the reinforcement 460 can also have a broken line type slit that is provided between the part that is connected to the cushion protruding part 122 and the part that is fused to the cushion main body 120, and when the tether 308 is cut, the reinforcement 460 is broken at the slit 324 by the expansive pressure of the cushion protruding part 122 so that the cushion protruding part 122 is released.

As explained above, the reinforcement 442 (refer to FIG. 23B) has the configuration in which the two-component conjugate fiber 444 and the single component fiber 446 are included, however, it is possible that the reinforcement 442 has another polymeric fiber including different materials and different thicknesses. According to these configurations, the elasticity and the heat resistance of the reinforcement can be suitably modified.

As explained above, the reinforcement 442 has the nonwoven fabric structure in which the fibers are intertwined each other, however, a woven fabric structure in which the fibers are weaved each other can also be adopted. Even though the woven fabric structure is adopted, as long as the fabric has the flexibility and the elasticity to some extent in the same manner as the nonwoven fabric structure, the woven fabric structure works as a ductile fabric material so that it is possible to be fused and to maintain the shape holding by the heating and pressuring processing as explained above.

Further, in FIGS. 19-22, 24, and 25 explained above, the cushion protruding part 122 to which each of the reinforcing clothes is provided is folded back to the outside of the cushion main body 120. However, although each of the reinforcing cloths is provided, the cushion protruding part 122 can also be folded back so as to be embedded into the inside of the cushion main body 120 by utilizing such as the tether 158 as exemplarily shown in FIG. 4B. In this case, each of the reinforcing clothes can suitably work for reinforcing the cushion protruding part 122 and holding the folded-back of the cushion protruding part 122.

Although the preferred embodiments of the present invention have been described with reference to the attached drawings, the above-described embodiments are preferred examples of the present invention, and other embodiments can also be carried out in various ways. Unless there is a limited description in the specification, the present invention should not be limited to the detailed shape, size, configuration, and arrangement of parts shown in the attached drawings. Further, the expressions and terms used in the specification are for illustrative purposes, and unless there is a limited description, the same are not limited thereto.

Accordingly, it will be apparent to one of ordinary skill in the art to conceive various modifications within the scope of the claims. All such modifications are intended to be included within the technical scope of the present invention. For instance, in the present invention mentioned above, in the side airbag device 100, the cushion 104 can be provided either at the near side or at the far side of the seat back 108 in the vehicle. However, in addition to the above descriptions, it is also possible that the side airbag device according to the present invention is used to a single-seated vehicle seat, for instance, such as a small mobility.

INDUSTRIAL APPLICABILITY OF THE INVENTION

The present invention can be utilized to a side airbag device that has a cushion main body that is provided at a side part of a vehicle seat and that is expandable from the side part to a vehicle front side by a gas.

What is claimed is:

1. A side airbag device comprising:
   an inflator for supplying a gas;
   a cushion main body disposed at a side of a seat of a vehicle and expandable from the side toward a front of the vehicle by the gas;
   a cushion protrusion disposed at a vehicle front side with respect to the cushion main body and expandable to project further toward the front of the vehicle by receiving the gas from the cushion main body;
   a tether that is string-shaped, the tether bridging from the cushion protrusion over a predetermined position of the side of the seat, the tether for maintaining the cushion protrusion in a state in which the cushion protrusion is folded back toward a rear of the vehicle;
   at least one sensor for receiving predetermined information from the vehicle, the predetermined information including a collision speed;
   a tether cutter for cutting the tether in response to the predetermined information obtained by the at least one sensor; and
   a control unit for the tether cutter,
   wherein the control unit operates the tether cutter to cut the tether when the collision speed received by the at least one sensor from the vehicle is greater than or equal to a predetermined collision speed such that when the tether is cut, the cushion protrusion is inflated and an inner pressure inside the cushion main body is suppressed.

2. The side airbag device according to claim 1,
   wherein the cushion protrusion has a protruding vent at a leading end of the cushion protrusion at the vehicle front side, and
   when the cushion main body is expended and deployed, the protruding vent opens toward the front of the vehicle.

3. The side airbag device according to claim 1,
   wherein the cushion protrusion has a side vent in an overlap area between the cushion main body and the folded-back cushion protrusion, and the side vent has an opening.

4. The side airbag device according to claim 1,
   wherein the cushion main body has a vent hole in an overlap area between the cushion main body and the folded-back cushion protrusion, and the vent hole has an opening.

5. The side airbag device according to claim 1,
   wherein when the cushion protrusion is expanded by receiving the gas, a width of the cushion protrusion in a vehicle vertical direction is tapered off toward the vehicle front side.

6. The side airbag device according to claim 1, wherein the tether bridges over a leading end of the cushion protrusion.

7. The side airbag device according to claim 1, further comprising:
   at least one reinforcement attached to the cushion protrusion for increasing rigidity of the cushion protrusion.

8. The side airbag device according to claim 7,
   wherein the reinforcement is thicker than a base cloth of the cushion main body.

9. The side airbag device according to claim 8,
   wherein the reinforcement is divided into a plurality of pieces that are disposed in a direction from the cushion main body toward a leading end of the cushion protrusion.

10. The side airbag device according to claim 7,
    wherein the cushion protrusion is in a state in which the cushion protrusion is folded back on a side surface of the cushion main body at either an interior side or an exterior side in a vehicle width direction, and
    the reinforcement is disposed at an outside of the folded-back cushion protrusion.

11. The side airbag device according to claim 7,
    wherein the cushion protrusion is in a state in which the cushion protrusion is folded back on a side surface of the cushion main body at either an interior side or an exterior side in a vehicle width direction, and
    the reinforcement is disposed at an inside of the folded-back cushion protrusion.

12. The side airbag device according to claim 7,
    wherein the reinforcement is in a state in which the reinforcement holds parts of the cushion protrusion and the cushion main body from both sides in a vehicle width direction.

13. The side airbag device according to claim 7,
    wherein the cushion protrusion has an outer peripheral sewing part in which a base cloth of the cushion protrusion is sewed along an outer peripheral of the cushion protrusion in view of a vehicle width direction, and
    the reinforcement is sewed together with the outer peripheral sewing part.

14. The side airbag device according to claim 1,
    wherein the tether maintains the cushion protrusion in a state in which the cushion protrusion is folded back so as to be embedded into an inside of the cushion main body, and
    the tether bridges over the predetermined position of the side of the seat by passing through the inside of the cushion main body.

15. The side airbag device according to claim 14,
    wherein a leading end that is folded back of the cushion protrusion is folded back again toward the front of the vehicle.

16. The side airbag device according to claim 1, wherein the cushion protrusion has an outer peripheral sewing part in which a base cloth of the cushion protrusion is sewed along an outer peripheral of the cushion protrusion in view of a vehicle width direction, and
    the tether is sewed together with the outer peripheral sewing part.

17. The side airbag device according to claim 16, wherein part of the tether located at the cushion protrusion is branched into two parts that are sewed together with the outer peripheral sewing part.

18. The side airbag device according to claim 17, wherein ends of the two parts that are branched from the tether are not overlapped relative to each other.

19. The side airbag device according to claim 1, wherein the cushion protrusion has an outer peripheral sewing part in which a base cloth of the cushion protrusion is sewed along an outer peripheral of the cushion protrusion in view of a vehicle width direction, and
    the tether is connected to an area of the cushion protrusion other than the outer peripheral sewing part.

20. The side airbag device according to claim 19, wherein part of the tether located at the cushion protrusion is branched into two parts, an end of one of the two parts is connected to a left side of the cushion protrusion in the vehicle width direction, and an end of the other of the two parts is connected to a right side of the cushion protrusion in the vehicle width direction.

21. The side airbag device according to claim 1, wherein the tether operates to prevent expansion and deployment of the cushion protrusion when the collision speed is less than the predetermined value.

22. The side airbag device according to claim 1, wherein the predetermined information received by the at least one sensor further includes a collision angle and a seat weight, and further wherein the predetermined collision speed at which the controller cuts the tether is adjusted based on one of the collision angle and seat weight.

23. The side airbag device according to claim 1, wherein the predetermined information received by the at least one sensor further includes a seat weight, and further wherein the predetermined collision speed at which the controller cuts the tether is adjusted downward when the at least one sensor senses a seat weight below a threshold seat weight.

24. A side airbag device comprising;
an inflator for supplying a gas;
a cushion main body disposed at a side of a seat of a vehicle and expandable from the side toward a front of the vehicle by the gas;
a cushion protrusion disposed at a vehicle front side with respect to the cushion main body and expandable to project further toward the front of the vehicle by receiving the gas from the cushion main body;
a tether that is string-shaped, the tether bridging from the cushion protrusion over a predetermined position of the side of the seat, the tether for maintaining the cushion protrusion in a state in which the cushion protrusion is folded back toward a rear of the vehicle;
a sensor for receiving predetermined information from the vehicle; and
a tether cutter for cutting the tether in response to the predetermined information obtained by the sensor,
wherein the tether maintains the cushion protrusion in a state in which the cushion protrusion is folded back on a side surface of the cushion main body at either an interior side or an exterior side in a vehicle width direction, and
wherein a retaining member is disposed on a side surface of the cushion main body on which the cushion protrusion is folded back, and a leading end of the cushion protrusion is inserted in the retaining member.

25. The side airbag device according to claim 24,
wherein a predetermined side surface hole is provided in the side surface of the cushion main body on which the cushion protrusion is folded back, and
the tether bridges over the predetermined position of the side of the seat by passing through an inside of the cushion main body from the side surface hole.

26. The side airbag device according to claim 25, further comprising:
an interference member that is disposed on the tether located in the inside of the cushion main body,
wherein the interference member prevents the tether from being pulled out from the side surface hole.

27. The side airbag device according to claim 26, further comprising:
an inner bag that is disposed in the inside of the cushion main body, and a base cloth of the inner bag surrounds the inflator, and
the tether passes through an inside of the inner bag, and the interference member is disposed in the inside of the inner bag and interferes with the inner bag.

28. The side airbag device according to claim 26, wherein the interference member is a knot provided at the tether.

29. The side airbag device according to claim 26, wherein the interference member is part of the tether that is in a state in which the tether is folded back and is sewed.

30. The side airbag device according to claim 26, wherein the interference member is a patch that is attached to the tether and that projects in a direction crossing the tether.

31. The side airbag device according to claim 25, further comprising:
a branching tether that bridges over between the cushion main body and the tether in an inside of the cushion main body so as to prevent the tether from pulling out from the side surface hole.

32. The side airbag device according to claim 25, wherein the side surface hole is provided on a linear line connecting between a connection of the tether on the cushion protrusion and the predetermined position of the side of the seat.

33. The side airbag device according to claim 24, wherein a leading end of the cushion protrusion is folded back again toward the front of the vehicle.

34. The side airbag device according to claim 24, wherein a further retaining member is disposed on a side surface of the cushion main body on which the cushion protrusion is folded back, and the tether passes through the further retaining member.

35. A side airbag device comprising:
an inflator for supplying a gas;
a cushion main body disposed at a side of a seat of a vehicle and expandable from the side toward a front of the vehicle by the gas;
a cushion protrusion disposed at a vehicle front side with respect to the cushion main body and expandable to project further toward the front of the vehicle by receiving the gas from the cushion main body;
a tether bridging from the cushion protrusion over a predetermined position of the side of the seat, the tether for maintaining the cushion protrusion in a state in which the cushion protrusion is folded back toward a rear of the vehicle;
at least one sensor for receiving predetermined information from the vehicle, the predetermined information including a collision speed, and further including at least one of a collision angle and a seat weight;
a tether cutter for cutting the tether in response to the predetermined information obtained by the at least one sensor; and
a control unit for the tether cutter,
wherein the control unit operates the tether cutter to cut the tether when the collision speed received by the at least one sensor from the vehicle is greater than or equal to a predetermined collision speed such that when the tether is cut, the cushion protrusion is inflated and an inner pressure inside the cushion main body is suppressed, and
wherein the predetermined collision speed at which the controller cuts the tether is adjusted based on the at least one of the collision angle and seat weight.

36. The side airbag device according to claim 35, wherein the predetermined collision speed at which the controller cuts the tether is adjusted downward when the at least one sensor senses a seat weight below a threshold seat weight.

* * * * *